(12) United States Patent
Blankenship et al.

(10) Patent No.: US 7,064,290 B2
(45) Date of Patent: Jun. 20, 2006

(54) ELECTRIC ARC WELDER AND METHOD FOR CONTROLLING THE WELDING PROCESS OF THE WELDER

(75) Inventors: George D. Blankenship, Chardon, OH (US); Russell K. Myers, Hudson, OH (US); Timothy M. O'Donnell, Chesterland, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 189 days.

(21) Appl. No.: 10/655,685

(22) Filed: Sep. 8, 2003

(65) Prior Publication Data

US 2005/0051524 A1    Mar. 10, 2005

(51) Int. Cl.
*B23K 9/09* (2006.01)

(52) U.S. Cl. .............................. 219/130.51; 219/130.21

(58) Field of Classification Search ........... 219/130.51, 219/130.21, 130.31, 130.32, 130.33, 110
See application file for complete search history.

(56) References Cited

U.S. PATENT DOCUMENTS

| | | | |
|---|---|---|---|
| 4,634,830 A * | 1/1987 | Furudate ..................... | 219/110 |
| 5,278,390 A | 1/1994 | Blankenship | |
| 5,991,169 A * | 11/1999 | Kooken ................. | 219/137 PS |
| 6,023,037 A * | 2/2000 | Church et al. ......... | 219/121.39 |
| 6,111,216 A | 8/2000 | Stava | |
| 6,472,634 B1 | 10/2002 | Houston | |
| 6,930,279 B1 * | 8/2005 | Myers et al. .......... | 219/130.51 |

OTHER PUBLICATIONS

*Embedded Systems Programming (Integer Square Root)* by Jack W. Crenshaw—Feb. 1998.
*Electrical Measurements and Heat Input Calculations for GMAW-P Process*— Nov. 2001.

* cited by examiner

Primary Examiner—Clifford C. Shaw
(74) *Attorney, Agent, or Firm*—Fay, Sharpe, Fagan, Minnich & McKee, LLP

(57) ABSTRACT

An operating system is provided for an electric arc welder including a high switching speed inverter power source for creating an arc voltage and arc current between an electrode and a workpiece. This operating system regulating the arc voltage to provide a voltage with a slope by using an error circuit to create an error output and having a first input with a signal representing the set voltage and a second input representing the sum of the actual arc voltage and the actual arc current multiplied by a slope constant. A DSP program reduces the error output by adjusting the voltage output of the inverter power source to change the actual arc voltage. The slope constant is in the range of 0–10%.

53 Claims, 20 Drawing Sheets

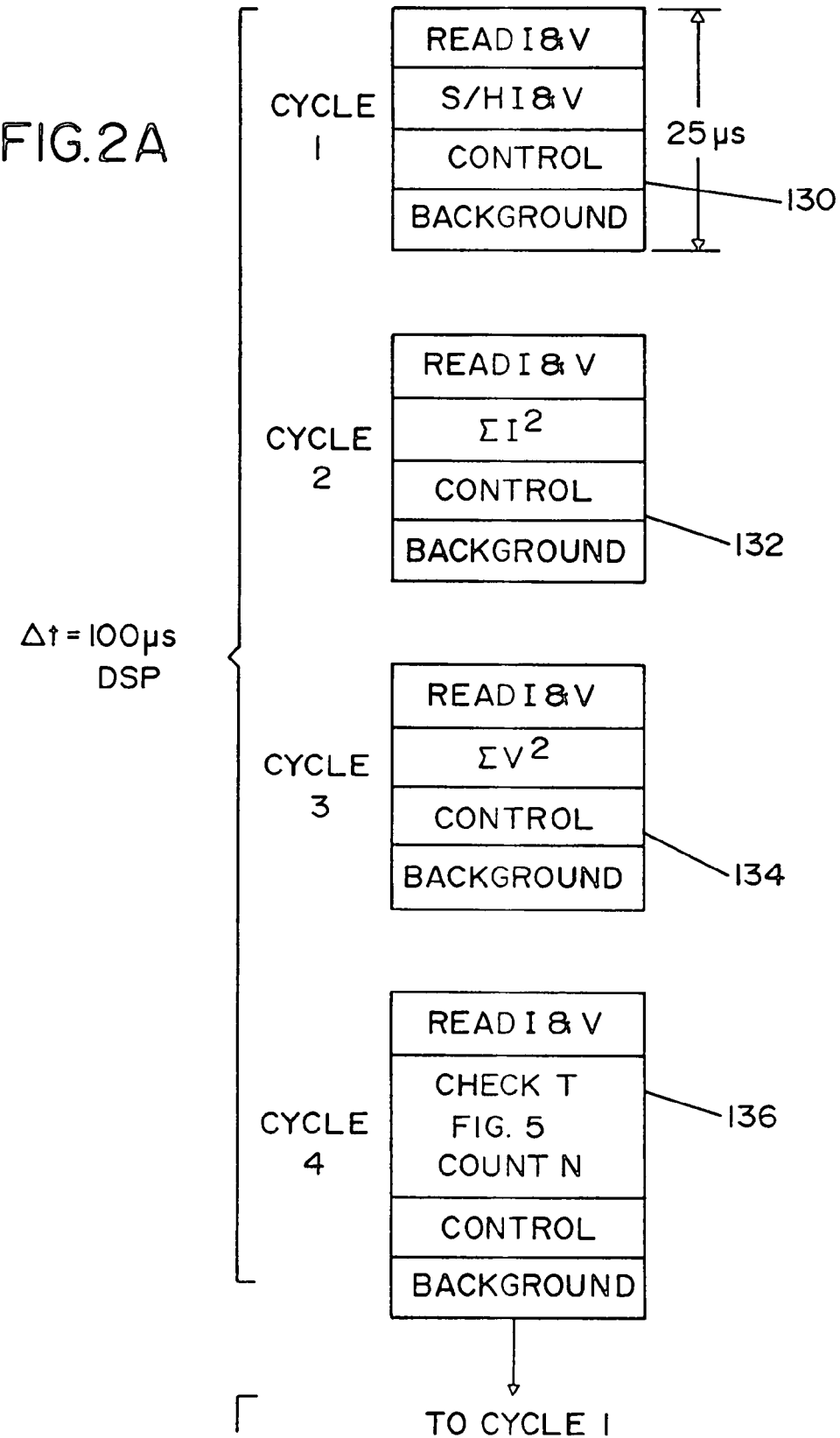

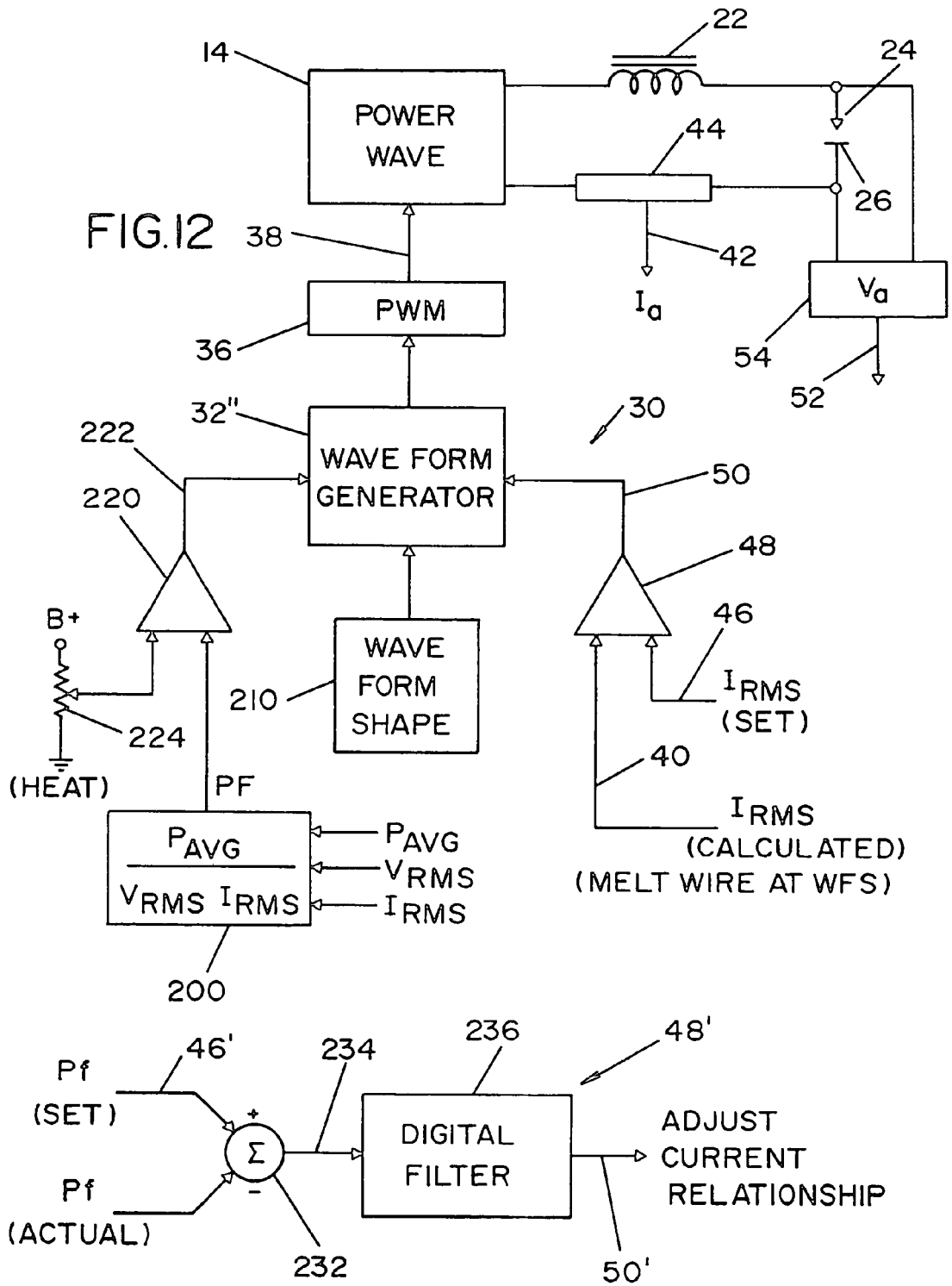

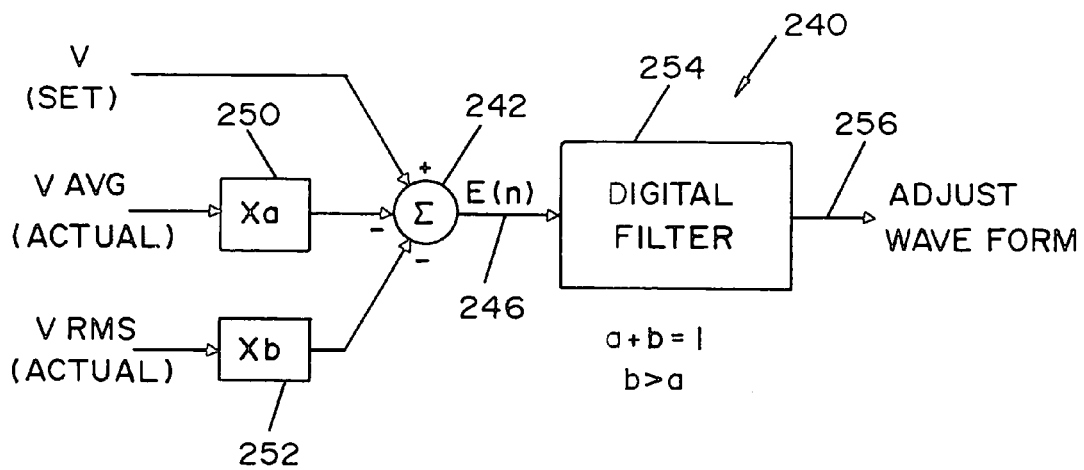
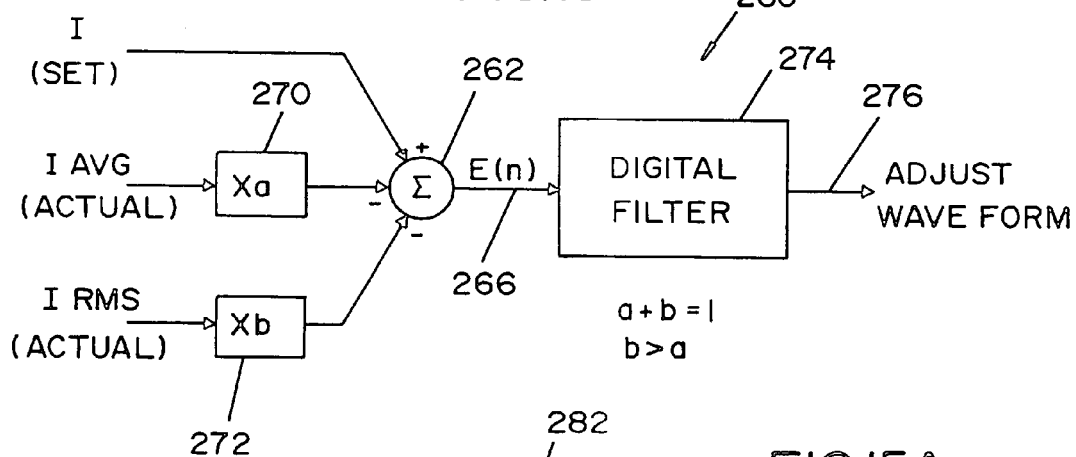
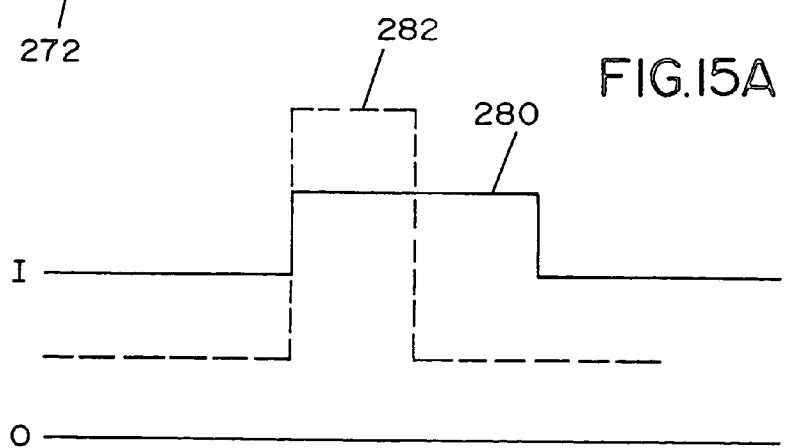

ELECTRIC ARC WELDER AND METHOD FOR CONTROLLING THE WELDING PROCESS OF THE WELDER

The present invention relates to the field of electric arc welding and more particularly to a novel electric arc welder and a system and method for controlling the welding process performed by the welder.

INCORPORATION BY REFERENCE

The invention relates to an electric arc welder for performing a welding process between an electrode and a workpiece wherein the welding process is comprised of a succession of current waveforms. Such current waveforms are created by a number of individual current pulses occurring at a frequency of at least 18 kHz with a magnitude of each of the current pulses being controlled by a wave shaper or waveform generator. In this type of electric arc welder, the waveform generator or wave shaper digitally controls a digital pulse width modulator, usually a program in the controller DSP. The pulse width modulator controls the switching of a high speed switching type power source, such as an inverter. This waveform control technology implemented in an electric arc welder has been pioneered by The Lincoln Electric Company of Cleveland, Ohio and is generally disclosed in Blankenship U.S. Pat. No. 5,278,390. The Blankenship patent is incorporated by reference herein as background illustrating a high speed switching power source, such as an inverter, for controlling a weld process including a series of controlled waveforms determined by the output of a waveform generator or wave shaper.

The invention involves an embedded algorithm for obtaining the root mean square of either the welding current or the welding voltage, as well as average power. The concept of an embedded system programming of the type used in the present invention is generally disclosed in an article by Jack W. Crinshaw entitled *Embedded Systems Programming* (Integer Square Root) This article published in February 1998 is incorporated by reference herein as illustrating the background technology used in the digital signal programmer of a standard controller associated with an electric arc welder. Also incorporated by reference herein is an article entitled *Electrical Measurements and Heat Input Calculations for GMAW-P Process* dated November 2001.

As background Houston U.S. Pat. No. 6,472,634 and Stava U.S. Pat. No. 6,111,216 are incorporated by reference. Prior application Ser. No. 10/626,919, now U.S. Pat. No. 6,930,279, is also incorporated by reference as background, non-prior art technology.

BACKGROUND OF THE INVENTION

As illustrated in prior patents and literature, electric arc welding has heretofore used the average weld voltage and the average weld current for controlling the operation of the power source in the welder. The digital controller includes a digital signal processor (DSP) for controlling a waveform generator or wave shaper that directs the operation of the normal pulse width modulator. This device creates the waveforms successively used by the welder to perform the welding process. Welders regulate the output current or voltage to an average value such as an average weld current by a feedback loop. For a constant voltage process that is welding in the "spray" region, the average current is an accurate gage of the welding process. However, in pulse welding, the average current and average voltage do not accurately reflect the result of the welding process including the deposition rate, heat zone and penetration. This is explained by a example of an ideal pulse welding process, such as one having 500 amperes for 25% of the time and 100 amperes of background current for 75% of the time has an output current of 200 amperes. However, the average current of the welding process merely indicates the deposition rate and does not reflect the true heat input to the welding operation. Consequently, when the welding process is controlled by a series of repetitive waveforms, such as A.C. welding or pulse welding, average current values can not control the heat input. Recently, the welding processes have become quite complex and now often involve a number of successive waveforms, such as A.C. current and pulse current, so the old technology of feedback control for the welding process is not completely accurate and requires a substantial amount of on-site manipulation by a person knowledgeable in welding, especially a person knowledgeable in the new waveform welding procedure using a welder, such as shown in Blankenship U.S. Pat. No. 5,278,390. With the advent of pulse welding using waveform generators and high speed switching power sources, such as inverters, the obtained weld heat has been adjusted by trial and error. Too much heat causes metal to burn through, especially in thin metal welding. Thus, the welding engineer modulates the average current and average voltage to provide the heat input to the welding process to a level so that burn through is theoretically eliminated. This procedure was applicable, however, only for a pure spray type welding process. This procedure of controlling the heat by the average current and average voltage was not applicable to the new generation of electric arc welders where waveforms are changed to control the welding process. This is the new waveform control technology to which the present invention is directed. The old technology used for non-waveform welding is inapplicable to controlling heat in a controlled waveform type welder. The heat is not known by merely reading the voltage and current when the new waveform type arc welders are employed. Consequently, the welding engineer when using waveform control technology changed the base frequency during pulse welding while maintaining a constant or set average voltage. Using this approach of frequency adjustment of a pulse welding procedure while maintaining a constant voltage, the heat could be adjusted by a trial and error technique. When this trial and error procedure was used to modify the waveforms in a new waveform welder, the heat could, indeed, be controlled; however, it was not precise and involves substantial technical knowledge combined with the trial and error procedures.

There is a distinct advantage in pulse welding. This welding process lowers the heat into the joint for the same wire feed speed as a "spray" or "globular" weld process. Thus, a lower heat setting can be set at the factory. The welder had a knob to adjust the nominal frequency, for the purpose indicated above. This change in base frequency did adjust the heat at the welding operation. This resulted in a slight change in the power factor of the welding process through the trial and error method when knowing that the average voltage times average current multiplied by the power factor equals the input heat. Thus, by using a knob to change the base frequency, the power factor was changed to determine heat. However, neither the factory nor the welding engineer at the welding site had the capabilities of directly controlling the power factor. Computation of actual power factor on the fly was not realized in prior control systems and method used for electric arc welders even of the type that used a waveform or wave shape control of the welding process. Consequently, with the introduction of the new waveform welding pioneered by The Lincoln Electric Company, there is a need to control the welding parameters to a value that accurately reflects the heat content. Only in this manner can weld parameters be used in a closed loop feedback system, or otherwise, to control the penetration and heat separately in a weld process using generated waveforms.

With the advent of the new wave shapes developed for electric arc welding, the present invention disclosed in prior application Ser. No. 10/626,776, filed Jul. 25, 2003 provides a control of the welding parameters to accurately reflect the heating content without use of trial and error procedures or the need for on site welding engineers to modulate and control the welding process. The invention is in welding with a series of generated waveforms, such as A.C. welding or A.C. welding.

In order to produce a stable weld while continuously feeding wire into the weld puddle, there are primarily two factors that must be balanced. First, the amount of weld metal wire and its material properties determine how much current is needed to melt the wire. Second, the amount of heat determines the heat affected zone or penetration of the welding process. In the past, an operator dialed in a voltage and wire feed speed and manually adjusted the electric stickout to control the amount of heat put into the weld. Welding literature typically claims that the pulse welding process lowers the current for the same deposition rate of a "spray" procedure. This is technically accurate. The average current is, indeed, much less than the average current of an equivalent "spray" procedure when using "pulse" welding. However, the rms currents of both procedures are about the same. The invention in the prior application involves the use of rms current for the feedback loop control of the welding process. Thus, the prior disclosure involves the use of rms current and rms voltage for controlling the welding process, especially when using a series of generated pulse waves, such as in A.C. welding and "pulse" welding using the technology described in Blankenship U.S. Pat. No. 5,278,390. By using the rms current and rms voltage, a more accurate control of the waveform type welding process is maintained. In accordance with the invention of the prior application, the rms value and the average value of current and voltage can be used for feedback control. In this aspect of the prior, but not prior art, invention, a first constant is multiplied by the rms value and a second constant is multiplied by the average value of the parameter. These two constants total one, so the constituent of root mean square in the feedback control is adjusted with respect to the constituent of average in the feedback control. These constants preferably total one. In practice, the rms constant is substantially greater than the average value constant so that normally the rms value is predominate over the average value. It has been found that the rms value more accurately reflects the heating value of the welding process. The feedback control of the electric arc welder maintains the rms voltage and rms currents constant, while adjusting the calculated real time power factor. This procedure of adjusting the power factor adjusts the heat input to the weld procedure to a desired level.

In the present invention, as well as in the prior application, the term "power factor" relates to the power factor of the welding process. This is a parameter obtained by using the present invention through the digital signal processor (DSP) of a welder having an embedded algorithm for calculating the root mean square of both current and voltage. The actual power factor is generated for a closed loop feedback system so that the welding power factor is adjusted to change the average power and, thus, the heat of the welding operation. Consequently, another aspect of the invention is maintaining the rms current constant while adjusting the power factor to change the heat at the welding process. When this is done in a waveform type welder wherein the waveform is created by a number of current pulses occurring at a frequency of at least 18 kHz with a magnitude of each pulse controlled by a wave shaper, the shape of the waveform in the welding process is modified to adjust the power factor. In this aspect of the invention, the current remains constant. This could not be accomplished in other types of welders, nor in waveform control welders, without use of the present invention.

The primary aspect of the invention in the prior application is the use of the novel control arrangement in an A.C. pulse welding process using waveform technology involving a wave shaper controlling a pulse width modulator. This type of welding process includes waveform with a positive segment and a negative segment wherein one of the segments has a background current which is lower than the peak current. This pulse is, thus, truncated with a peak current portion normally having a leading edge and trailing edge and a magnitude and a background current with a magnitude and length. A circuit to adjust either the background current or the peak current portion of the pulse is employed to maintain the power factor at a given level. Preferably, the background current magnitude or length is adjusted to maintain the given power factor level. The "given level" is adjusted to change the heat of the welding process. Consequently, the A.C. pulse welding process to which the invention is particularly applicable utilizes an adjustment of the background current portion to change the power factor and, thus, control the heat of the welding process.

The invention of the prior application is primarily applicable for use in an electric arc welder of the type having a pulse shaper or waveform generator to control the shape of the waveform in the welding process. This type of welder has a digitized internal program functioning as a pulse width modulator wherein the current waveform is controlled by the waveform generator or wave shaper as a series of current pulses. The duty cycle of these high speed pulses determines the magnitude of the current at any given position in the constructed waveform of the weld process. This type of welder has a high speed switching power source, such as an inverter. The invention involves the combination of this particular type of power source and implementation of the program and algorithm to form the functions set forth above.

In accordance with the invention of the prior application, there is provided an electric arc welder for performing a given weld process with a selected waveform performed between an electrode and a workpiece. This type of welder generates the waveforms and includes a controller with a digital signal processor. The sensor reads the instantaneous weld current and a circuit converts the instantaneous current into a digital representation of the level of the instantaneous current. The digital processor has a program circuit or other program routine to periodically read and square the digital representation at a given rate. A register in the processor sums a number of squared digital representations to create a summed value. An embedded algorithm in the processor periodically divides the summed value by a number N, which is the number of samples obtained during the sampling process of the waveform. The quotient provided by dividing the summed value by the number of samples is then directed to the algorithm for taking the square root of the quotient to thereby digitally construct an rms signal representing the root mean square of the weld current. This same procedure is used for obtaining the root mean square or rms signal representing the weld voltage. Consequently, the initial aspect of the invention is the use in a waveform welder, a real time signal indicative of the root mean square of the weld current primarily, but also the weld voltage. The waveform is created by a number of current pulses occurring at a frequency of at least 18 kHz, with a magnitude of each pulse controlled by a wave shaper or waveform generator. The "switching frequency" is the frequency of the pulse width modulator controlling the switching frequency of the power source. This frequency is normally substantially greater than 18 kHz and preferably in the range of 40 kHz.

The system, as defined above, has a sampling rate for the sensed current and/or voltage. In accordance with another aspect of the present invention, this sampling rate is less than 40 kHz or in another aspect it is in the general range of 5 kHz to 100 kHz. In practice, the sampling rate provides a sample each 0.10 ms. It is anticipated that this rate should have a time as low as 0.025 ms.

The operating system, as so far described, is particularly applicable for sub-arc welding as well as for AC welding wherein the waveform is controlled by a plurality of closely spaced current pulses dictated by the operation of the waveform generator through the use of a pulse width modulator having either a duty cycle or a current mode control. However, such system when operated in the voltage regulated mode maintains the arc voltage constant at various levels of arc current. Thus, when the current changed while the voltage remained constant, dynamics of the weld puddle and welding quality sometimes suffered. It is necessary therefore to control both voltage and current to maintain a constant burn in a welding operation when using at high speed switching inverter as employed in the system described above. The described system does not respond when in the voltage regulated mode in accordance with a load line followed by a transformer based power source. Such transformer based power source, such as The Lincoln Electric AC 1200 or DC 1000, has a droop in voltage as the current increases. This voltage current curve allows operating points that generally maintain quality over a large range of currents while the power source is in a voltage regulated mode. This advantageous feature is not accomplished in inverter type power sources employing waveform technology wherein the waveform generator controls the pulse width modulator for regulating a current pulse to dictate the welding process.

SUMMARY OF INVENTION

The present invention relates to an operating system for use on an inverter power source of the type using a waveform generator to create waveforms by a series of closely spaced current pulses. This operating system for an inverter based power source produces a slope in the voltage/current load line that somewhat duplicates the slope of the load line of a transformer based power source. This is extremely important when using high currents exceeding 100 amperes. The present invention is particularly applicable for sub-arc, AC welding and it will be described with reference thereto; however, the invention is broad and includes the modification of an inverter type power source operated in the voltage regulated mode to produce a droop in the load line. In accordance with another aspect of the present invention, the addition of the slope or droop in the load line is combined with a minimum current and a maximum current which is generally below the maximum current of the power source. By using the minimum current and maximum current feature of the present invention, the voltage regulated operation is clipped at a minimum current and at a maximum current so the power source operates between these preset variables in the digital signal processor (DSP) of the inverter type power source. In other words, slope, minimum current and maximum current variables are added to an inverter type power source, such as a Power Wave manufactured by The Lincoln Electric Company. The operating system employs weld tables and is performed by the DSP of the controller so that there are three additional global variables to regulate voltage. The variables are slope, which is a percentage of current added to the actual voltage to determine the operating point of the power source. The slope is a percentage which varies between 0–10% and preferably between 0–5%. A 0 slope is the default value. The minimum current set by the operating system of the present invention is the amount of current desired while in the voltage regulator mode of operation. The default value for this minimum current is 0 amperes. It is normally set at least about 10–50 amperes. In the operating system the load line has a maximum current which is the amount of current that the power source will supply while in the voltage regulated mode. The default value is the maximum permitted current of the particular weld table being used. When the DSP of the welder controller is off, the three new variables are reset to the same state that has been used in the past, such as a zero slope, a zero minimum current and a maximum current allowed as the maximum current. The present invention loads variables into the DSP as a new state to be run by a state table loaded into the controller. The main operating system writes the new variables into the DSP after the welder is turned on. The present invention is employed during the voltage regulated mode. The maximum current is a value chosen from the weld table of the Power Wave welder. To this value is added the minimum current. When the actual current drops below the minimum current an error term is created. This error signal is used to control the output of the welder to adjust the current while in the voltage mode to a value equal to or greater than the set minimum current. The basic operation of the present invention is to apply a slope to the load line. This is accomplished by determining a primary or first error signal between a reference voltage, which is normally the set voltage, and a value representing the actual arc voltage plus the actual arc current times the slope factor as a percentage. In practice, the slope factor is a constant generally in the range of 0–0.0500. Thus, a 5% current term is added to the voltage for voltage regulation in the present invention. A set of variables including the maximum current, the minimum current and the slope percentage is available for each weld table of the controller. The variables are preferably fixed values; however, they can also be based upon the work point of the various work tables available in an inverter welder of the type discloses in Blankenship U.S. Pat. No. 5,278,390, incorporated by reference herein. The control scheme of the present invention will not prevent the output of machine from going outside of the desired limits set into the DSP; however, the operating system does attempt to bring the output of the machine back inside of the desired operating limits set in the DSP. One example of the present invention involves a minimum current set at 50 amperes and a slope set at 0% to regulate at 20 volts. As the electrode is pulled away, current starts to drop. When the current drops below 50 amperes, the operating system of the present invention will boost the output of the inverter to keep the current above 50 amperes. Of course, this control scheme can only turn the inverter on full to accomplish this objective. Once the inverter is at full operation, the current will ride with whatever the main transformer can deliver. To this example, a slope of 5% has been added. As the current increases to 100 amperes, the detected error of the voltage is 5 volts below the set voltage. This provides a droop in the load line. By using the present invention, a slope is added to the voltage line of an inverter type power source. An advantage of this invention is that only specific areas of the generated waveform used in the voltage regulated mode can be controlled by the invention, while other areas of the same waveform can be operated in accordance with standard technology. Thus, the present invention is operated at certain portions of the waveform by employing a voltage with a slope. As the current increases, the target voltage decreases by the slope concept. With a slope of 5%, a change of 100 amperes causes the target voltage to decrease by 5 volts. In this manner, the inverter type power source mimics a transformer based power source with a slope in the voltage/current curve. Since a waveform generator dictates the voltage and current of the waveform, the operating system of the present invention is used with the waveform generator so that the operating system performs a dynamic relationship of voltage as it is compared to current. In the long term, however, the waveform generator dominates and corrects the voltage. If the voltage decreases, the current increases to maintain the power generally constant. The present invention operates in a narrow range between the set minimum current and the set maximum current.

In accordance with the present invention, there is provided an electric arc welder for performing a given weld process with a selected current waveform outputted by a high switching speed inverter power source creating an arc voltage and an arc current between an electrode and a workpiece. The waveform comprises a number of closely spaced current pulses normally controlled by a pulse width modulator operated in a current mode or a duty cycle mode. The welder of the present invention is operated in a voltage regulated mode with the voltage controlled by a primary error circuit having an error output signal generated by the difference between a first input with a signal representing the set voltage for at a least a portion of the waveform and a second input with a signal representing the sum of the arc voltage and the arc current multiplied by the slope constant. A DSP embedded program is used to reduce the error output signal by adjusting the voltage of the waveform in a dynamic manner. Thus, a slope is created in the load line, even though the welder is operated by an inverter type power source. The slope concept is generally in the range of 0 to 10% and is preferably about 5%.

In accordance with an aspect of the present invention there is a second error circuit having a second error output signal generated by the difference between a first input with a signal representing the minimum desired current and a second input with a signal representing the actual arc current. A DSP embedded program maintains the second error signal positive with the arc current equal to or greater than the minimum current. In a like manner, the welder includes a third error circuit having a third error output signal generated by the difference between a first input with a signal representing the maximum current of the power source and a second input with a signal representing the arc current. A DSP embedded program maintains the third error signal negative with the arc current equal to or less than the minimum current. When employing the present invention, the minimum current and maximum current is adjustable with the minimum current generally greater than 50 amperes. The invention is particularly applicable for AC submerged arc welding.

In accordance with another aspect of the invention, the inverter based electric arc welder, when operated in a voltage regulated mode has a digital signal processor (DSP) with a control circuit to generate a voltage/current load line whereby the DSP circuit adds to the voltage a slope controlled by the arc current multiplied by a slope constant. This constant is generally in the range of 0–10% and preferably about 5%.

The primary object of the present invention is an operating system for an electric arc welder of the type employing a high speed switching inverter power source whereby the welder is operated in a regulated voltage mode and has a slope on the voltage load line.

Still another object of the present invention is the provision of an operating system, as defined above, which operating system is easily applied to a standard DSP control system of an inverter type power source.

A further object of the present invention is the provision of an operating system, as defined above, where the current is limited to a minimum level, a maximum level, or both.

These and other objects and advantages will become apparent from the following description.

BRIEF DESCRIPTION OF DRAWINGS

The invention is apparent from the drawings which are:

FIG. 2A is a cycle chart of digital signal processor utilized for performing the preferred embodiment of the present invention as set forth in FIG. 2 showing the timing function of the digital signal processor;

FIG. 12 is a block diagram, as shown in FIG. 11, wherein the power factor value from FIG. 10 is adjusted manually to control the power factor of the welding process while maintaining the rms current constant;

FIG. 13 is a block diagram showing a standard digital filter controlled by the relationship of the actual power factor to the set power factor to adjust the shape of the weld current by adjusting the waveform generator input to maintain a constant power factor;

FIG. 14 is a block diagram showing control of the welder by a relationship of average voltage and a rms voltage compared with a set voltage signal to adjust the shape of the waveform to maintain a set voltage;

FIG. 15 is a block diagram showing control of the welder by a relationship of average current and a rms current compared with a set current signal to adjust the shape of the waveform to maintain a set current;

FIG. 15A is a current graph showing how the waveform is adjusted to maintain the set value, be it current, voltage or power factor;

DETAILED DESCRIPTION OF THE PREFERRED EMBODIMENTS

Figure 1:
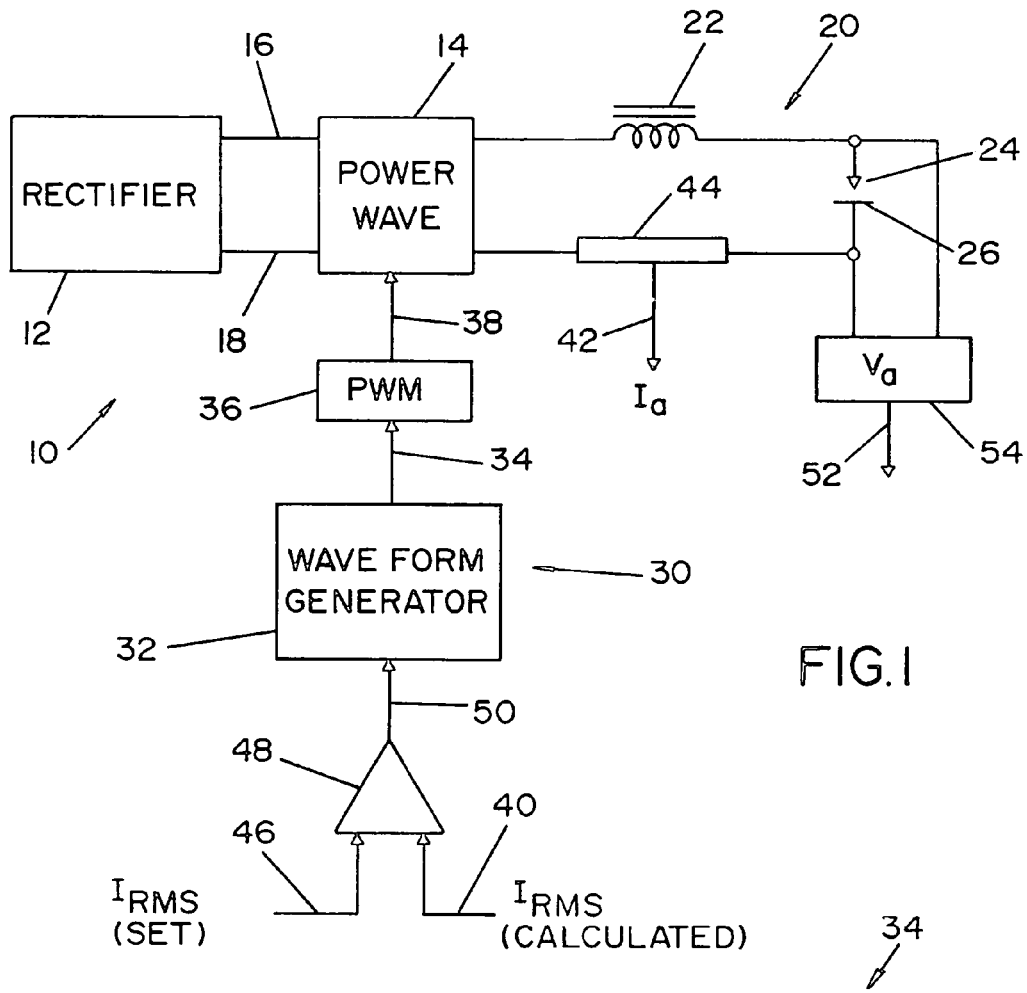
FIG. 1 is a block diagram illustrating an electric arc welder utilizing the present invention for controlling the waveform generator.

With reference to FIG. 1, electric arc welder 10 is shown in block diagram form. A three-phase rectifier 12 provides power to high speed switching-type power supply 14 across a DC link in the form of input leads 16, 18. In a preferred embodiment, high speed switching-type power supply 14 is an inverter, such as a Power Wave welding power supply available from Lincoln Electric Company of Cleveland, Ohio. However, a high speed switching chopper or other high speed switching-type power supply can also be employed. High speed switching-type power supply 14 performs a preselected welding process. In accordance with present welding technology, high speed switching-type power supply 14 preferably switches at about 18 kHz or higher, and more preferably at 40 kHz or higher. High speed switching-type power supply 14 energizes welding circuit 20 that includes inductor 22 and electrode 24 forming an arc gap with workpiece 26 during performance of the welding operation. Typically, electrode 24 is a forward advancing welding wire from a supply spool. The welding wire is driven toward workpiece 26 at a selected wire speed during performance of the welding operation.

Controller 30 controls high speed switching-type power supply 14 during the welding operation. In accordance with the present welding technology, controller 30 is a digital device including waveform generator 32 that outputs power level waveform 34 represented by a line that is the input to pulse width modulator 36. Pulse width modulator 36 produces pulse train 38 (represented by a line) of pulses with pulse widths corresponding to the power level of waveform 34. In other words, waveform 34 is converted into pulse width modulated pulse train signal 38 by pulse width modulator 36. Pulse width modulator 36 produces pulses of controlled width at a frequency preferably above 18 kHz, and more preferably about 40 kHz or higher, which is the input to high speed switching-type power supply 14. The power supply switching is controlled by pulse-width modulated pulse train 38 to energize welding circuit 20 in accordance with power level waveform 34.

Waveform 34 implements a desired welding process. Typically, a welding process is made up of a waveform train of repeating waveforms. For pulse welding, power level waveform 34 has a preselected wave shape for generating a welding process pulse. The average power or true heat produced in the welding process implemented by waveform 34 over a time interval $[T_1, T_2]$ is given by:

$$P_{avg} = \frac{1}{T_2 - T_1} \int_{T_1}^{T_2} v(t) \cdot i(t) \, dt, \qquad (1)$$

where $P_{avg}$ is the average power, $v(t)$ is the instantaneous voltage, $i(t)$ is the instantaneous welding current, $v(t) \cdot i(t)$ is the instantaneous power, and $T_1$ and $T_2$ are the starting and ending time points of the time interval, respectively, of the integration. In the case of a substantially periodic waveform, the average power can be expressed in terms of root-mean-square (rms) voltage and rms current according to:

$$P_{avg} = V_{rms} \cdot I_{rms} \cdot PF \quad (2),$$

where the rms voltage, $V_{rms}$, and rms current, $I_{rms}$, are given by:

$$V_{rms} = \sqrt{\frac{\int_{T_1}^{T_2} [v(t)]^2 \, dt}{T_2 - T_1}}, \quad I_{rms} = \sqrt{\frac{\int_{T_1}^{T_2} [i(t)]^2}{T_2 - T_1}}, \quad (3)$$

respectively, and PF is the power factor. In computing the average power and the rms current and voltage values for waveform 34 that implements pulse welding, the time interval $[T_1, T_2]$ preferably corresponds to one pulse or a plurality of pulses. In waveform-controlled welding, the pulse time interval may vary for successive pulses. Hence, in the described preferred embodiment, the starting and stopping times $T_1$ and $T_2$ are extracted from waveform 34 as event signals T determined from a characteristic feature of waveform 34.

Equation (3) can be rewritten to define the power factor PF according to:

$$PF = \frac{P_{avg}}{V_{rms} \cdot I_{rms}}. \quad (4)$$

There is in general a close relationship for substantially any waveform 34 between the rms voltage and current values and the average power.

In contrast, the average voltage, $V_{avg}$, and average current, $I_{avg}$, given by:

$$V_{avg} = \frac{\int_{T_1}^{T_2} v(t) \, dt}{T_2 - T_1}, \quad I_{avg} = \frac{\int_{T_1}^{T_2} i(t) \, dt}{T_2 - T_1}, \quad (5)$$

have a close relationship with the average power only for certain waveforms, such as are used in constant-voltage "spray" type welding. However, if, for example, the waveform includes a stepped pulse that is 500 amperes for 25% of the time and 100 amperes for 75% of the time, the rms value is 265 amperes, while the average value is 200 amperes. In this case, the rms values provide a more accurate true heat value.

With continuing reference to FIG. 1, controller 30 of electric arc welder 10 implements an exemplary pulse welding process in which the magnitude of waveform 34 is controlled using an rms current 40 that is calculated from an instantaneous welding current $I_a$ 42 measured across shunt 44. In the constant current welding process shown in FIG. 1, rms current 40 is compared with set rms current 46 by digital error amplifier 48 to produce error signal 50 that controls an amplitude of waveform 34 to maintain a constant rms current. Similarly, for a constant voltage welding process, control is suitably based on an rms voltage calculated from instantaneous welding voltage $V_a$ 52 measured across the weld by voltmeter 54.

Figure 2:
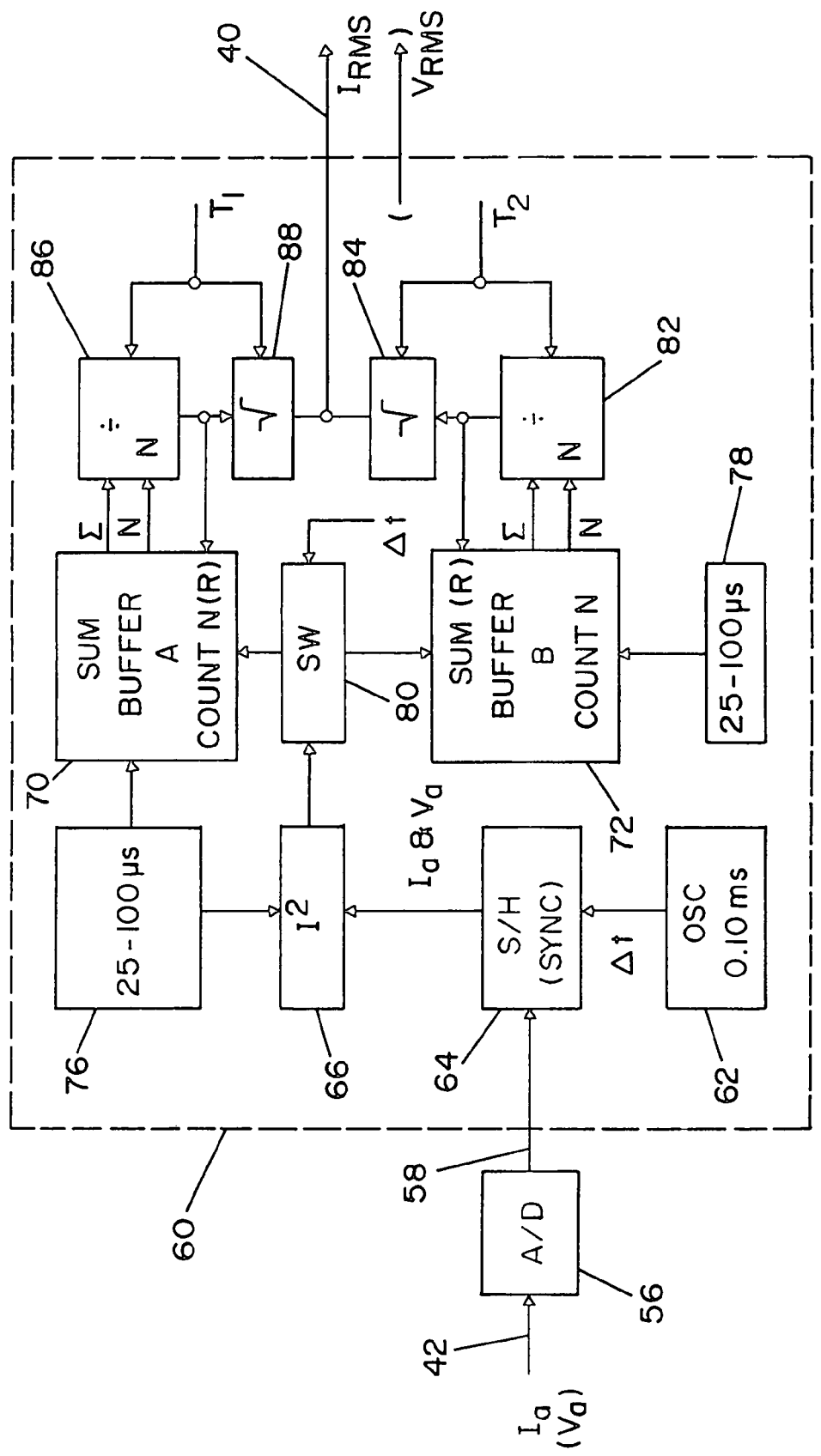
FIG. 2 is a flow chart and block diagram illustrating the computer program of the digital signal processor utilized for performing the preferred embodiment of the present invention.

With reference to FIG. 2, computation of the rms current from instantaneous welding current $I_a$ 42 includes processing with analog-to-digital converter 56 to produce digitized instantaneous current 58, which is the input to digital signal processing block 60. Digital signal processing block 60 performs the current squared integration of Equation (3) digitally as a Riemann sum, dividing the current into time intervals Δt defined by oscillator 62 for the summing. The digitizing interval Δt for the Riemann sum is suitably about 0.1 milliseconds to provide adequate samples for each pulse or repetition of waveform 34. Sample-and-hold circuit 64 holds the digitized current for the period Δt, and squaring processor 66 computes the square of the held current value.

In order to enable continuous summation of rms current in parallel with related processing such as the computation of the square-root operation of Equation (3), the summing preferably employs two alternating storage buffers, namely first buffer 70 (identified as Buffer A), and second buffer 72 (identified as Buffer B). Values are stored in the active buffer at intervals 76, 78 that are preferably in a range of about 0.025–0.100 milliseconds. When first buffer 70 is active, switch 80 transfers values at time intervals Δt to first buffer 70, which accumulates the current-squared values and also maintains a sample count N of a number of accumulated current samples. As a background process during accumulation in first buffer 70, the contents of second buffer 72 are processed by division processor 82 to divide by the number of samples N, and by square-root processor 84 to complete computation of the root-mean-square calculation of Equation (3).

At a selected event signal T generated by a characteristic of waveform 34, the operation of buffers 70, 72 switches. Second accumulator 72 is cleared, and switch 80 subsequently transfers current-squared samples into second accumulator 72. As a background process during accumulation in second buffer 72, the contents of first buffer 70 are processed by division processor 86 to divide by the number of samples N, and by square-root processor 88 to complete computation of the root-mean-square calculation of Equation (3).

Figure 7:
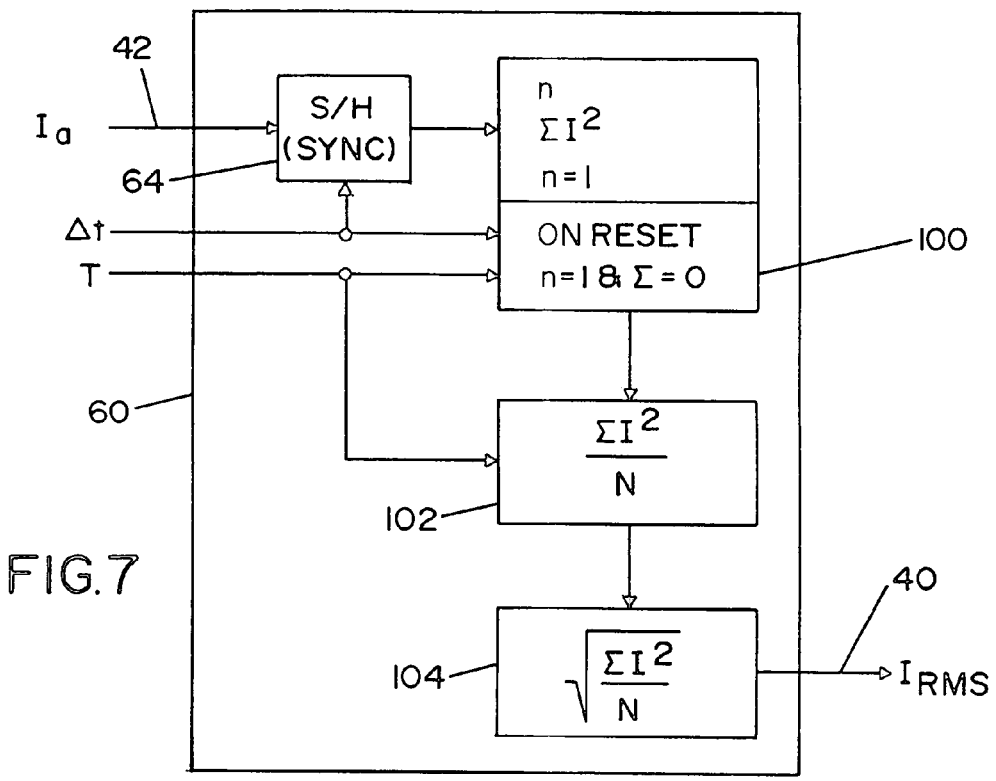
FIG. 7 is a block diagram of the program used to create the rms current signal using the present invention.

FIG. 7 shows a simplified block diagram of digital signal processing block 60, which omits the details of the alternating summation buffers 70, 72 and related switching circuitry that are shown in detail in FIG. 2. In FIG. 7, current-squaring block 66, switch 80, and alternating summation blocks 70, 72 are represented by a single summation block 100 that sums current-squared samples between occurrences of the event signal T triggered by a characteristic of waveform 34, and also maintains the count N of the number of accumulated samples. Division background processes 82, 86 of FIG. 2 are represented by a single normalization background process 102 in FIG. 7. Square-root background processes 84, 88 of FIG. 2 are represented by a single square root background process 104 in FIG. 7.

Figure 8:
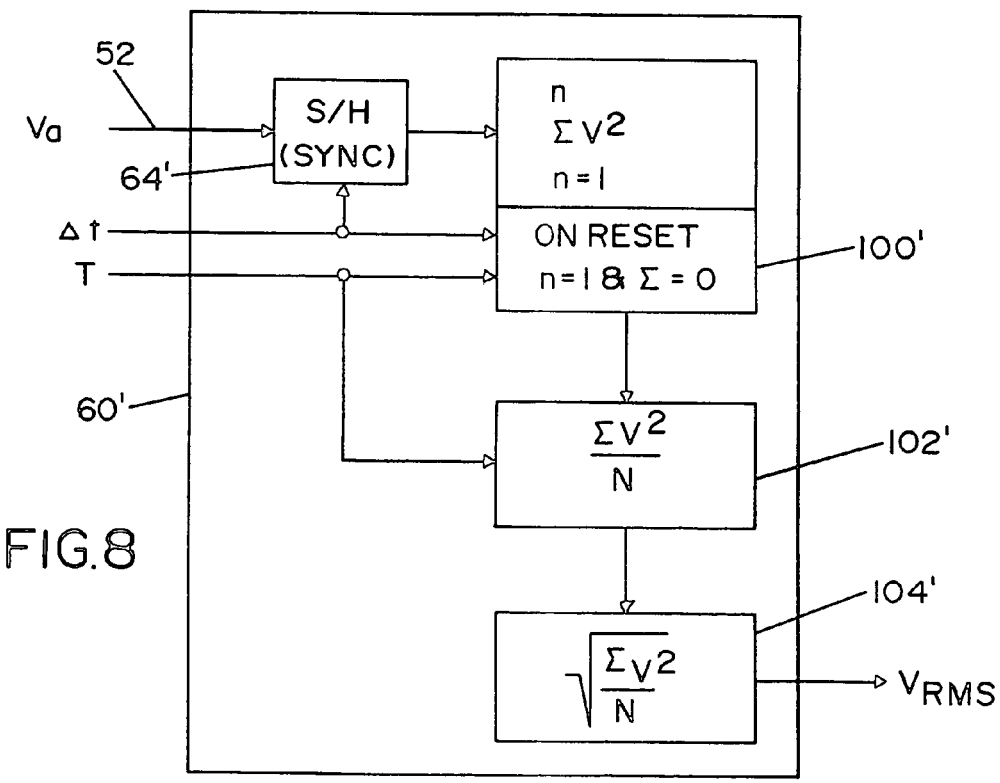
FIG. 8 is a block diagram like FIG. 7 for creating the rms voltage signal.

With reference to FIG. 8, it will be appreciated that digital signal processing block 60 shown in FIG. 2 and represented in simplified form in FIG. 7 is readily adapted to perform rms voltage calculations, by replacing measured instantaneous current $I_a$ 42 with instantaneous voltage $V_a$ 52 measured by voltmeter 54 of FIG. 1. FIG. 8 shows rms voltage digital signal processing block 60' in a simplified form analogous to the simplified form of FIG. 7. The digitized voltage is processed by sample-and-hold circuit 64' which holds the digitized voltage for the period Δt. Voltage-squared summation block 100' sums voltage-squared samples and maintains a count N of the number of accumulated voltage samples. Preferably, summation block 100' uses alternating summation buffers analogous to buffers 70, 72 shown for the current-squared summation in FIG. 2. Normialization background process 102' divides the voltage-squared sample sum by the number of samples N. Square root background process 104' takes the square root to complete implementation of the rms voltage $V_{rms}$, mathematically shown in Equation (3).

Figure 9:
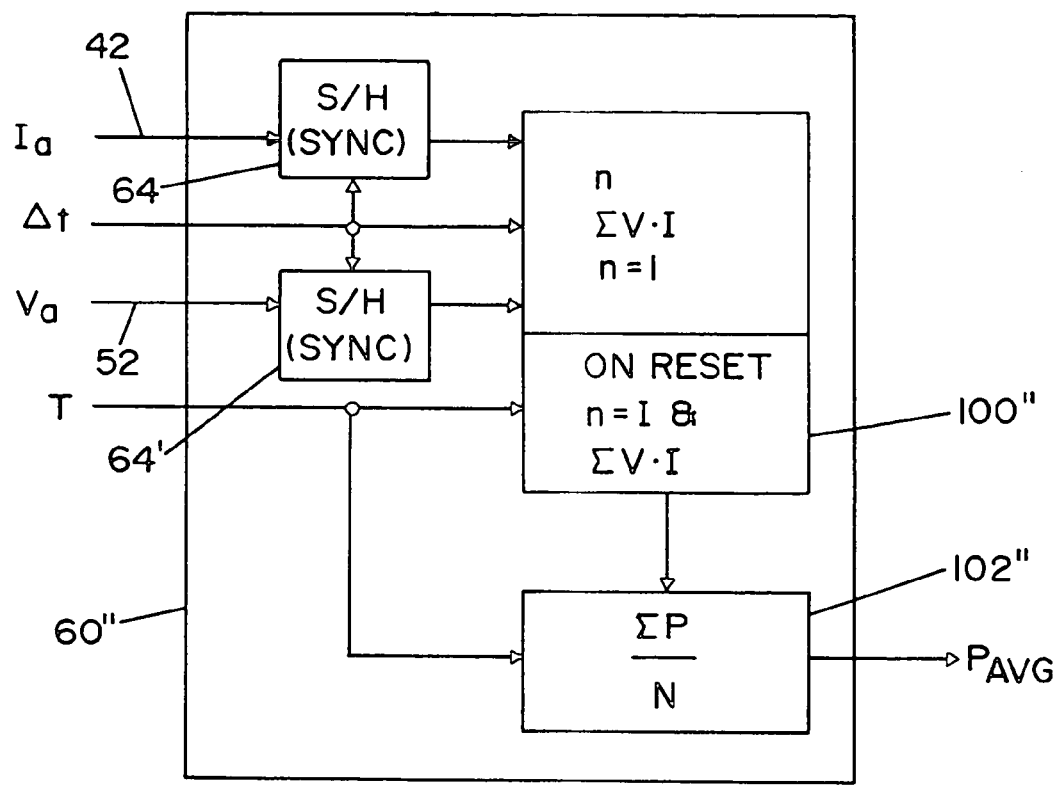
FIG. 9 is a block diagram showing the aspect of the invention for creating an average power signal.

With reference to FIG. 9, it will be appreciated that digital signal processing block 60 shown in FIG. 2 and represented in simplified form in FIG. 7 is similarly readily adapted to perform average power calculations, by inputting both measured instantaneous current $I_a$ 42 and measured instantaneous voltage $V_a$ 52. FIG. 9 shows average power digital signal processing block 60" in a simplified form analogous to the simplified form of FIG. 7. Sample-and-hold circuits 64, 64' which hold the digitized current and voltage, respectively, for the period $\Delta t$, are accessed by current-times-voltage summation block 100" which sums current-times-voltage samples and maintains a count N of the number of accumulated current-times-voltage samples. Preferably, summation block 100" uses alternating summation buffers analogous to buffers 70, 72 shown for the current-squared summation in FIG. 2. Normalization background process 102" divides the current-times-voltage sample sum by the number of samples N to produce the average power $P_{avg}$ shown mathematically in Equation (1).

Figure 4:
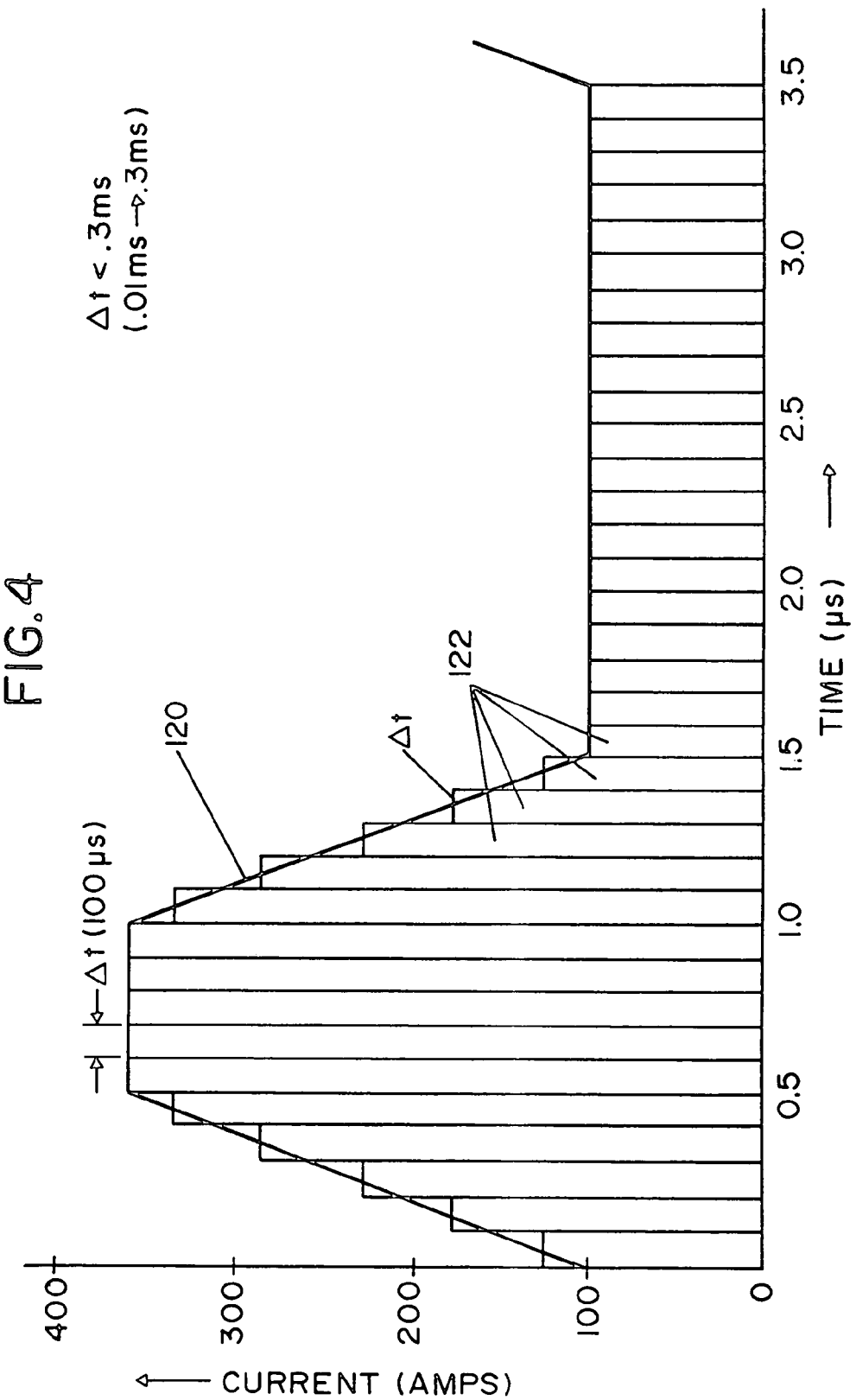
FIG. 4 is a current waveform graph illustrating the sampling concept used in the present invention to create current signals used in obtaining rms values.

Digital signal processing blocks 60, 60', 60" compute the rms current, the rms voltage, and the average power as Riemann sums. FIG. 4 shows exemplary current waveform 120 that is digitally sampled. Each digital sample is represented by a rectangular sample bar 122 of time duration $\Delta t$ and height corresponding to the digitized value of current waveform 120 held by sample-and-hold circuit 64 at the time interval $\Delta t$.

Digital signal processing blocks 60, 60', 60" are optionally implemented as separate processing pathways that execute in parallel. However, in a preferred embodiment digital signal processing blocks 60, 60', 60" use some common digital signal processing blocks into which the sampled voltage and current signals are time-domain multiplexed. Such a multiplexing approach reduces the amount of circuitry required. Each summation (voltage-squared, current-squared, and voltage-times-current) has its own alternating summation buffer set (for example, summation buffer set 70, 72 for summing current-squared values as shown in FIG. 2).

With reference to FIG. 2A, a suitable process cycling for the time-domain multiplexing is shown. The process cycling employs four cycles 130, 132, 134, 136 each occupying one-fourth of the sampling period $\Delta t$. For the exemplary $\Delta t$ equal 0.1 millisecond, each of the four cycles 130, 132, 134, 136 occupies 0.025 milliseconds. During first cycle 130, the voltage $V_a$ and current $I_a$ are digitized and sample/held. During second cycle 132, the current-squared is computed and added to the current-squared summation. During third cycle 134, the voltage-squared is computed and added to the voltage-squared summation. During fourth cycle 136, a check is performed to determine whether an event signal T has been detected, and the sample count is incremented. Moreover, throughout the cycling other processing, such as computation of the square roots of values stored in the inactive summation buffers, can be performed as background processes. Similarly, digital signal processing welding control operations, such as waveform shaping described by Blankenship U.S. Pat. No. 5,278,390, can be performed as background control processes during the cycling.

Figure 3A:
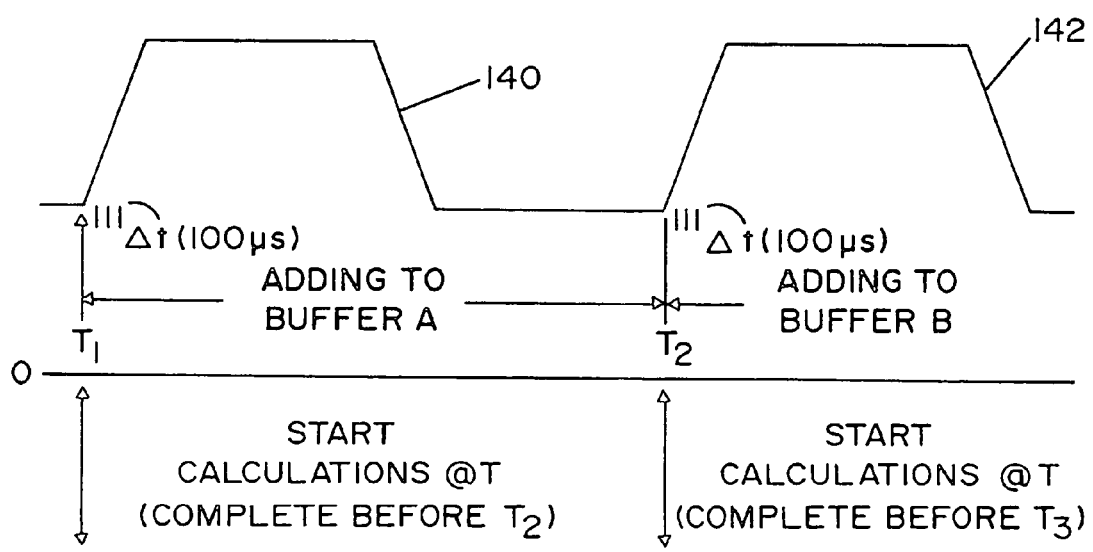
FIG. 3A is a waveform graph for the logic applied to the state table in FIG. 3.
Figure 6:
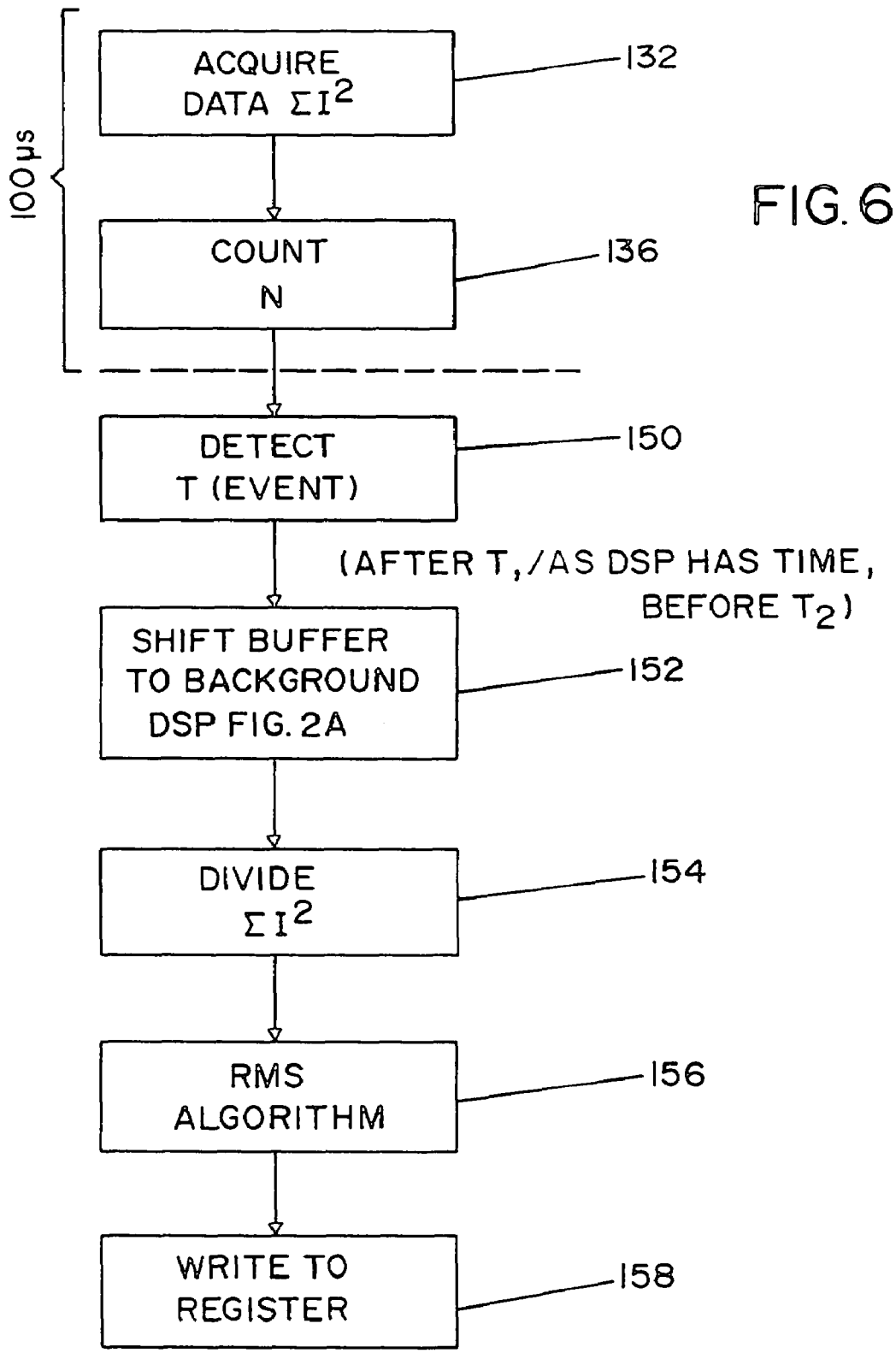
FIG. 6 is a flow chart of the preferred embodiment of the present invention as performed in the digital signal processor during the cycles shown in FIG. 2A.

With reference to FIGS. 2 and 2A, and with further reference to FIG. 3A and FIG. 6, the cycling as applied to the current-squared calculation is described. FIG. 3A illustrates current waveform 34 extending between first event signal $T_1$ and second event signal $T_2$. Event signals $T_1, T_2$ are suitably generated by a circuit controlled by waveform 34. In FIG. 3A, the circuit generates event signal $T_1$ responsive to onset of the rising edge of current pulse 140, and the circuit generates event signal $T_2$ responsive to onset of the rising edge of current pulse 142. Thus, there is a current pulse between each two successive event signals T. Rather than detecting the rising edge, the event signals can instead be generated by detecting another characteristic of the pulse, such as the falling edge of the current pulse.

During the time interval between event signal $T_1$ and event signal $T_2$, current-squared samples are accumulated in summation buffer 70, as indicated in FIG. 3A by the notation "Adding to Buffer A". Each occurrence of second cycle 132 of FIG. 2A adds another current-squared sample to buffer 70. Although not shown in FIG. 2, 3A, or 6, voltage-squared samples and average power samples are preferably being accumulated in their respective buffers during the other cycles of the four-cycle process of FIG. 2A. Detection of event signal $T_2$ is indicated by detection block 150 of FIG. 6. Responsive to detection 150, buffers 70, 72 are switched so that buffer 72 is used to accumulate current-squared samples of next pulse 142 of waveform 34, while buffer 70 in which the current-squared samples of pulse 140 are accumulated is shifted 152 into the background. In background processing, the current-squared sum is divided 154 by the number of samples N and the square-root is taken 156 to complete the rms algorithm. The computed rms current value for pulse 140 is written 158 to a register for use in welding process control.

Figure 5:
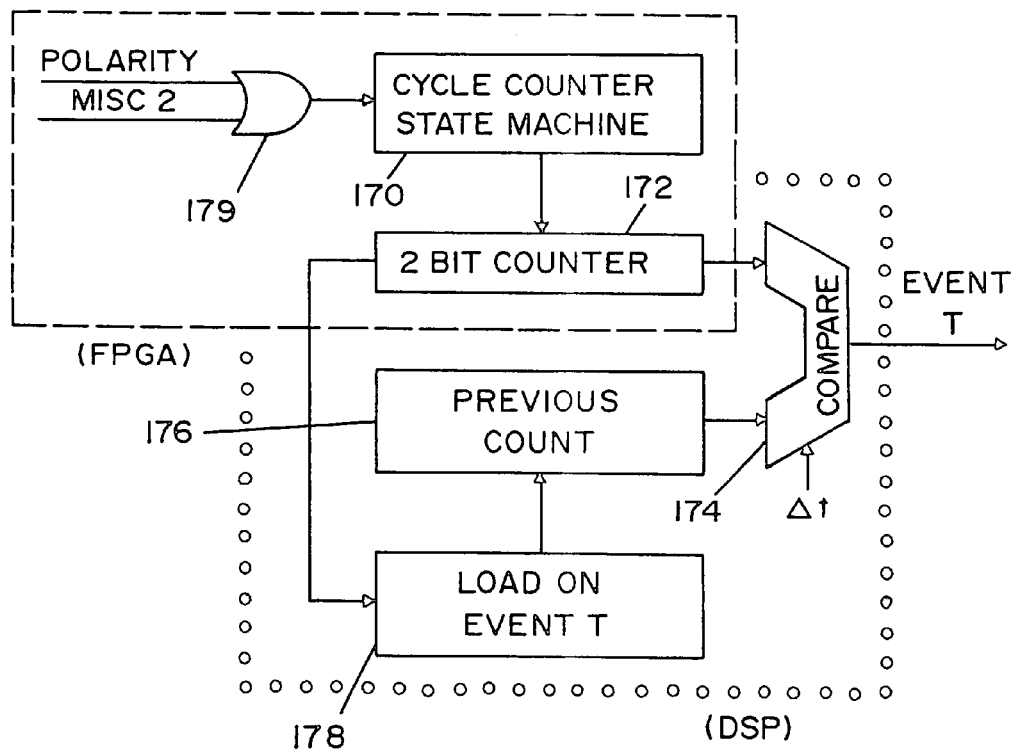
FIG. 5 is a block diagram and flow chart of the cycle counter in a field programmable gate array incorporated in the controller and a block diagram of the use of this cycle counter information in the digital signal processor (DSP) to obtain an event signal T.

With reference to FIG. 5, a suitable method for generating event signals T is described. A field programmable gate array (FPGA) includes cycle counter state machine 170 that updates two-bit counter 172. State machine 170 is configured to increment two-bit counter 172 each time the state changes. Each change of state corresponds to an occurrence of event signal T. In the digital signal processing (DSP), two-bit comparator 174 compares the value of two-bit counter 172 with previous counter value register 176 during fourth cycle 136 of FIG. 2A. A change in the value of two-bit counter 172 indicated by the comparison corresponds to an occurrence of event signal T. Responsive to event signal T, digital gate 178 loads the new value of two-bit counter 172 into previous counter value register 176. In this arrangement, the value stored in two-bit counter 172 is not significant; rather, a change in the counter value is detected.

Figure 5A:
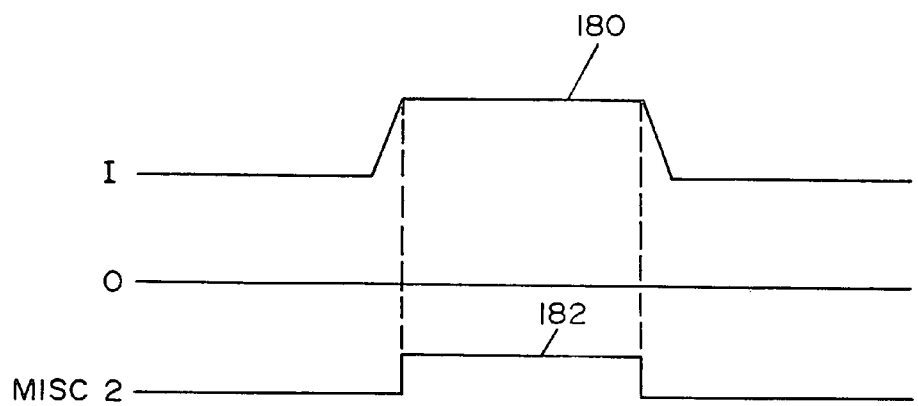
FIG. 5A is a graph of the pulse current and logic at one terminal of the flow chart shown in FIG. 5 when pulse welding is used instead of A.C. welding.

With continuing reference to FIG. 5 and with further reference to FIG. 5A, the polarity of waveform 34 along with an auxiliary "Misc2" signal are input to state machine 170 through "OR" gate 179. This arrangement enables the FPGA to generate event signals T for pulse welding and for a.c. welding. In the case of a.c. welding, Misc2 is set to zero so that the polarity signal feeds through to cycle counter state machine 170. For pulse welding, Misc2 is set to one when the arc is shorted, and zero when the arc is not shorted. FIG. 5A shows a graph of pulse current 180 and the value of Misc2 182 when pulse welding is used instead of A.C. welding.

Figure 3:
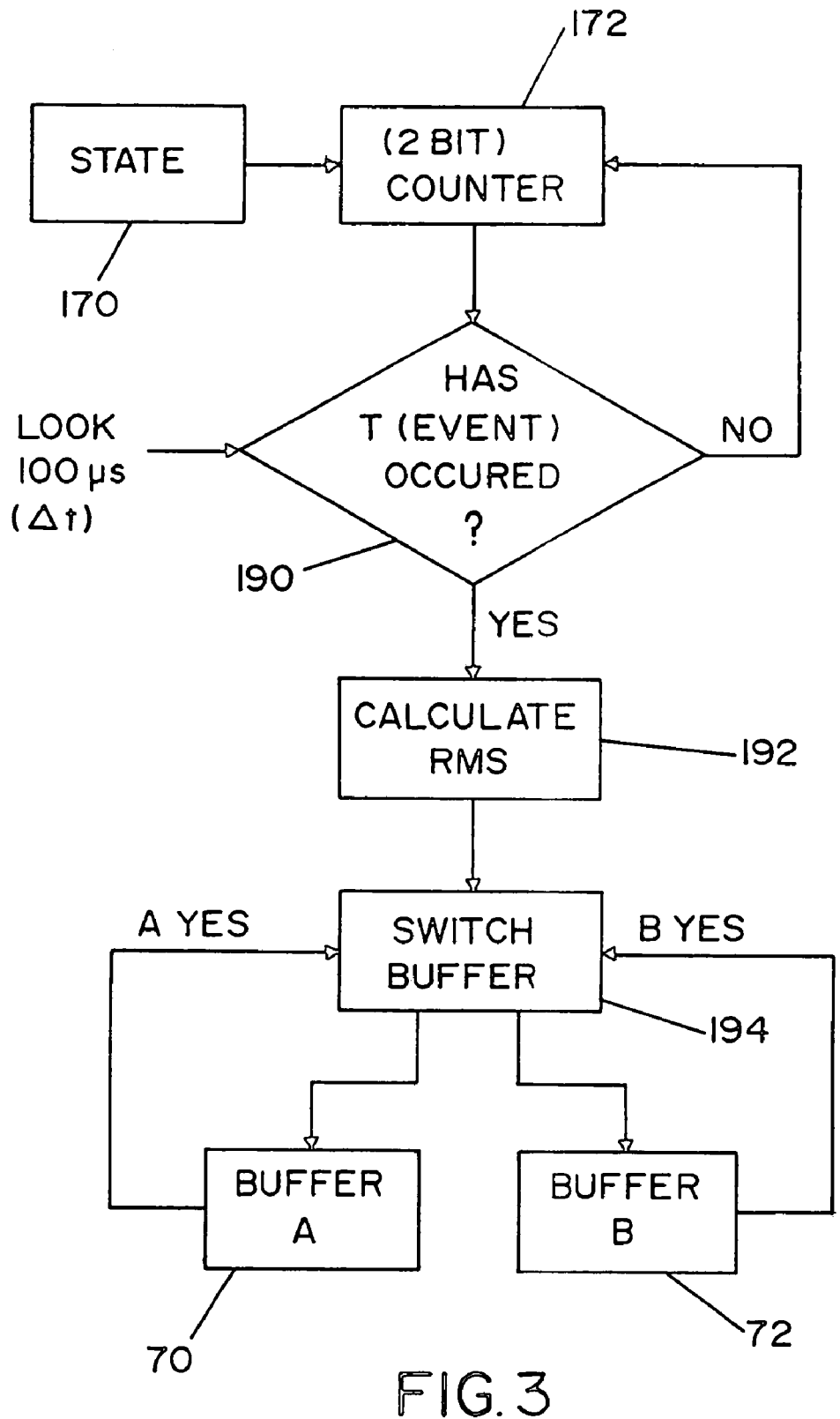
FIG. 3 is a flow chart of the program for implementing aspects of the cycles in FIG. 2A after creation of an event signal T.

With continuing reference to FIG. 5 and with further reference to FIG. 3, events initiated by an occurrence of event signal T are described. At fourth cycle 136 of FIG. 2A, the digital signal processing performs a check 190 to see if an occurrence of event signal T has been detected. This is done by comparing the current value of two-bit counter 172 with stored counter value 176 using two-bit comparator 174. If no change in counter value has occurred, the digital signal processing continues to loop through the four states 130, 132, 134, 136 of FIG. 2A. However, if check 190 detects an occurrence of event signal T, the rms value is computed 192 as set forth in Equation (3) and in accordance with FIGS. 2 and 7. Computation 192 is a background digital signal process. Additionally, a buffer switch 194 is performed so that whichever buffer (buffer A 70 or buffer B 72) had been active is switched to the background, and whichever buffer (buffer B 72 or buffer A 70) had been the background buffer is made the active accumulation buffer.

Exemplary digital signal processing circuitry and associated FPGA circuitry for substantially real-time computation of rms voltage $V_{rms}$, rms current $I_{rms}$, and average power $P_{avg}$ have been described with reference to FIGS. 1–9. The described digital signal processing circuitry implements Equations (1) and (3) using Riemann sums, and is exemplary only. Those skilled in the art can readily modify the illustrated digital circuitry or substitute other digital circuitry to perform these computations or substantial equivalents thereof. The illustrated circuitry provides certain features that may be optionally omitted or modified. For example, separate and independent digital signal processing pathways can be provided for computing each of the rms voltage $V_{rms}$, rms current $I_{rms}$, and average power $P_{avg}$ values. In this arrangement, time-domain multiplexing aspects of the circuitry can be omitted. Rather than having two alternating accumulators, a single accumulator can be employed in conjunction with a storage register that stores the previous sum for background normalization/square root processing. Moreover, if the digital signal processing is sufficiently fast or if parallel processing is employed, the temporary storage may be omitted entirely, and the normalization/square root processing performed substantially in real time for intervals between successive event signals T. Still further, a trapezoidal or otherwise-shaped integral element can be substituted for rectangular sample bars 122 of the Riemann sum illustrated in FIG. 4. Those skilled in the art can make other modifications to the exemplary digital signal processing and FPGA circuitry illustrated herein for implementing Equations (1) and (3) as digital circuitry.

Figure 10:
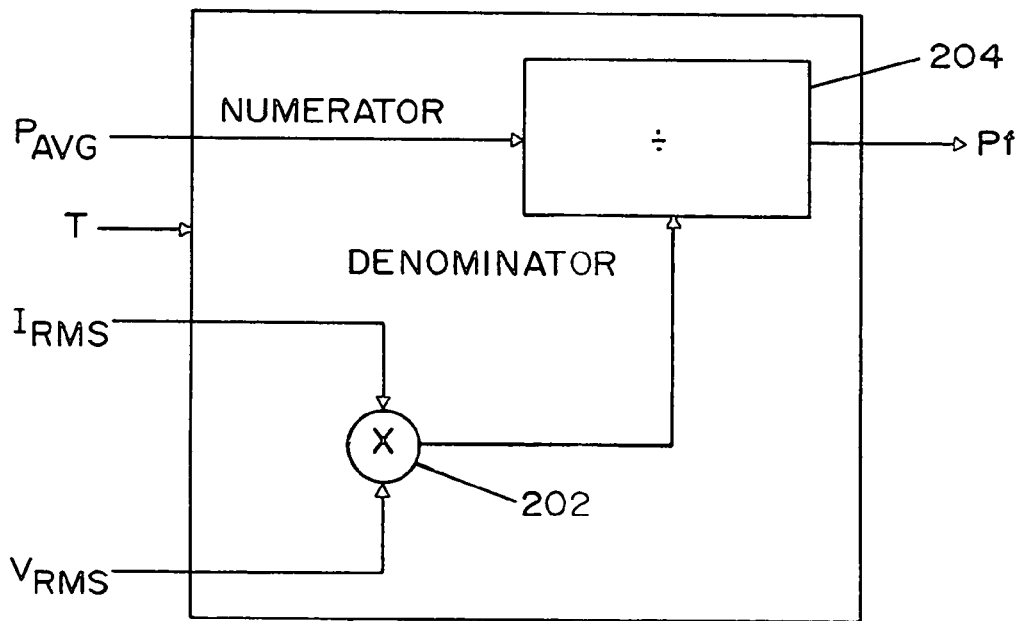
FIG. 10 is a block diagram showing the aspect of the present invention for creating the actual power factor of the welding process for use in the present invention.

With reference to FIG. 10, digital signal processing block 200 computes the power factor (PF) in accordance with Equation (4) from the rms voltage $V_{rms}$, rms current $I_{rms}$, and average power $P_{avg}$ values. The denominator of Equation (4) is computed using multiplier 202 acting on the rms current $I_{rms}$, and rms voltage $V_{rms}$, output by digital signal processing blocks 60, 60' of FIGS. 7 and 8, respectively. The average power $P_{avg}$ output by digital signal processing bloc 60" of FIG. 9 is divided by this denominator using division block 204 to compute the power factor PF.

Figure 11:
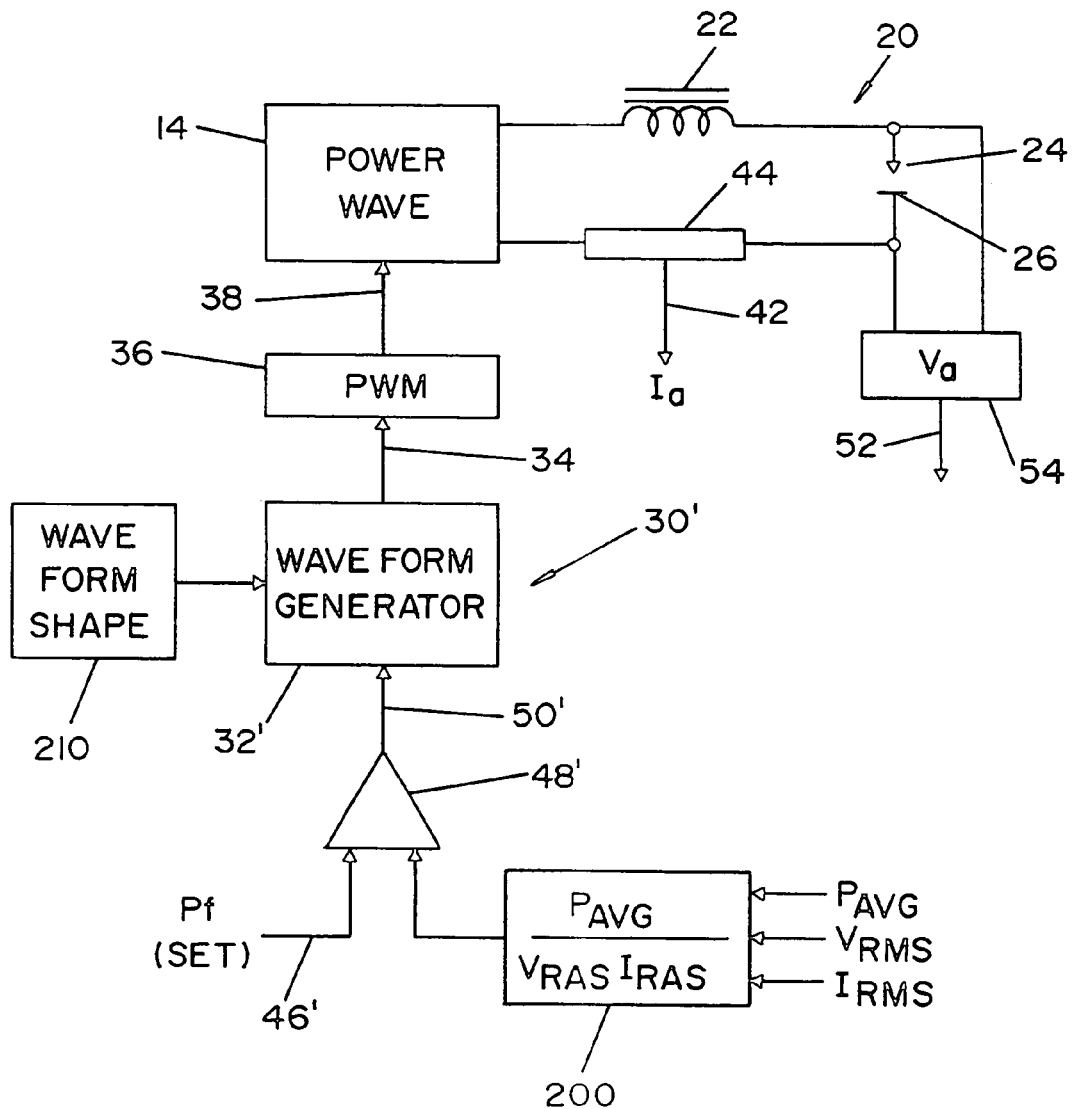
FIG. 11 is a block diagram of a welder utilizing the power factor value of FIG. 10 to maintain a constant power factor for the weld process in pulse welding.

With continuing reference to FIG. 10 and with further reference to FIG. 11, electric arc welder 10 of FIG. 1 is readily adapted to implement a constant power factor control of the weld process in pulse welding. Controller 30' is a modified version of controller 30 of FIG. 1. Digital error amplifier 48' produces error signal 50' based on the power factor PF. Digital error amplifier 48' compares the power factor PF output by digital signal processing block 200 (shown in detail in FIG. 10) with PF set value 46'. Waveform generator 32' modifies selected waveform shape 210 based on error signal 50' as described in Blankenship U.S. Pat. No. 5,278,390 which is incorporated by reference herein.

With continuing reference to FIG. 10 and with further reference to FIG. 12, electric arc welder 10 of FIG. 1 is similarly readily adapted to implement a constant current welding process in which heat input to the weld is controlled by adjusting the power factor PF. Controller 30" is a modified version of controller 30 of FIG. 1. The rms current 40 is compared with set rms current 46 by digital error amplifier 48 to produce current error signal 50 as in FIG. 1. Additionally, a second digital error amplifier 220 produces power factor error signal 222 by comparing the power factor PF output by digital signal processing block 200 (shown in detail in FIG. 10) with adjustable welding heat set value 224. Waveform generator 32" modifies selected waveform shape 210 based on error signals 50, 222 as described in Blankenship U.S. Pat. No. 5,278,390.

With reference returning to FIG. 11 and with further reference to FIG. 13, in digital error amplifier 48' the power factor error signal optionally incorporates digital filtering. As shown in FIG. 13, digital error amplifier 48' includes difference operator 232 that computes difference signal 234 which is proportional to a difference between the computed power factor and power factor set value 46'. Difference value 234 is input into digital filter 236 which generates control signal 50' for adjusting the waveform shape in accordance with the method described in Blankenship U.S. Pat. No. 5,278,390. In one suitable embodiment, digital filter 236 is an infinite impulse response filter. The digital filter can be used to amplify the signal, smooth the signal, remove high frequency signal components, or otherwise adjust the control signal.

With reference to FIG. 14, a digital error amplifier 240 for constant voltage control is shown. Digital error amplifier 240 includes difference operator 242 that computes difference signal E(n) 246 given by:

$$E(n)=V_{set}-(a \cdot V_{avg}+b \cdot V_{rms}) \tag{6},$$

where $V_{set}$ is a set voltage value, $V_{avg}$ is an average voltage value computed in accordance with Equation (5), a is an average voltage weighting factor implemented by multiplier 250, $V_{rms}$ is the rms voltage of Equation (3) that is output by digital signal processing block 60' of FIG. 8, and b is an rms voltage weighting factor implemented by multiplier 252. It will be recognized that difference signal E(n) 246 can be biased by adjusting the weighting factors a and b toward average voltage control, rms voltage control, or a selected weighted combination of average voltage and rms voltage control. Because the rms voltage is typically a better measure of the true heat input to the weld by the welding process, the rms weight b is preferably greater than the average weight a, that is, b>a. Moreover, the sum of the weighting factors is preferably unity, that is, a+b=1. Optionally, difference signal E(n) 246 is processed by digital filter 254, such as an infinite impulse response filter, to amplify, smooth, or otherwise manipulate difference signal E(n) 246 to produce control signal 256 for adjusting the waveform shape in accordance with the method described in Blankenship U.S. Pat. No. 5,278,390.

With reference to FIG. 15, a digital error amplifier 260 for constant current control is shown. Digital error amplifier 260 includes difference operator 262 that computes difference signal E(n) 266 given by:

$$E(n)=I_{set}-(a \cdot I_{avg}+b \cdot I_{rms}) \tag{7},$$

where $I_{set}$ is a set current value, $I_{avg}$ is an average current value computed in accordance with Equation (5), a is an average current weighting factor implemented by multiplier 270, $I_{rms}$ is the rms current of Equation (3) that is output by digital signal processing block 60 of FIG. 7, and b is an rms current weighting factor implemented by multiplier 272. It will be recognized that difference signal E(n) 266 can be biased by adjusting the weighting factors a and b toward average current control, rms current control, or a selected weighted combination of average current and rms current control. Because the rms current is typically a better measure of the true heat input to the weld by the welding process, the rms weight b is preferably greater than the average weight a, that is, b>a. Moreover, the sum of the weighting factors is preferably unity, that is, a+b=1. Optionally, difference signal E(n) 266 is processed by digital filter 274, such as an infinite impulse response filter, to amplify, smooth, or otherwise manipulate difference signal E(n) 266 to produce control signal 276 for adjusting the waveform shape in accordance with the method described in Blankenship U.S. Pat. No. 5,278,390.

With reference to FIG. 15A, an exemplary waveform shape adjustment in accordance with the waveform shape adjustment method of Blankenship U.S. Pat. No. 5,278,390 is illustrated. Two waveforms 280, 282 are shown in solid and dashed lines, respectively. For b=1 and a=0 in Equation (6) or Equation (7) (for voltage control or current control, respectively), waveforms 280, 282 have equal rms values. However, the average value is generally different for waveforms 280, 282. Compared with waveform 280, waveform 282 has a reduced voltage or current background magnitude and an increased voltage or current magnitude in the pulse.

Moreover, it will be appreciated that the pulse repetition period of waveforms 280, 282 may be different. This difference in repetition period is accounted for in the digital signal processing by performing the Riemann sums of Equations (1), (3), and (5) over intervals between successive event signals T, instead of performing the Riemann summing over time intervals of fixed length. Generating event signals T at a rising pulse edge or other identifiable characteristic of the waveform allows the summation interval to track the repetition period of the waveform as the repetition period is adjusted by the waveform shaping.

Figure 16:
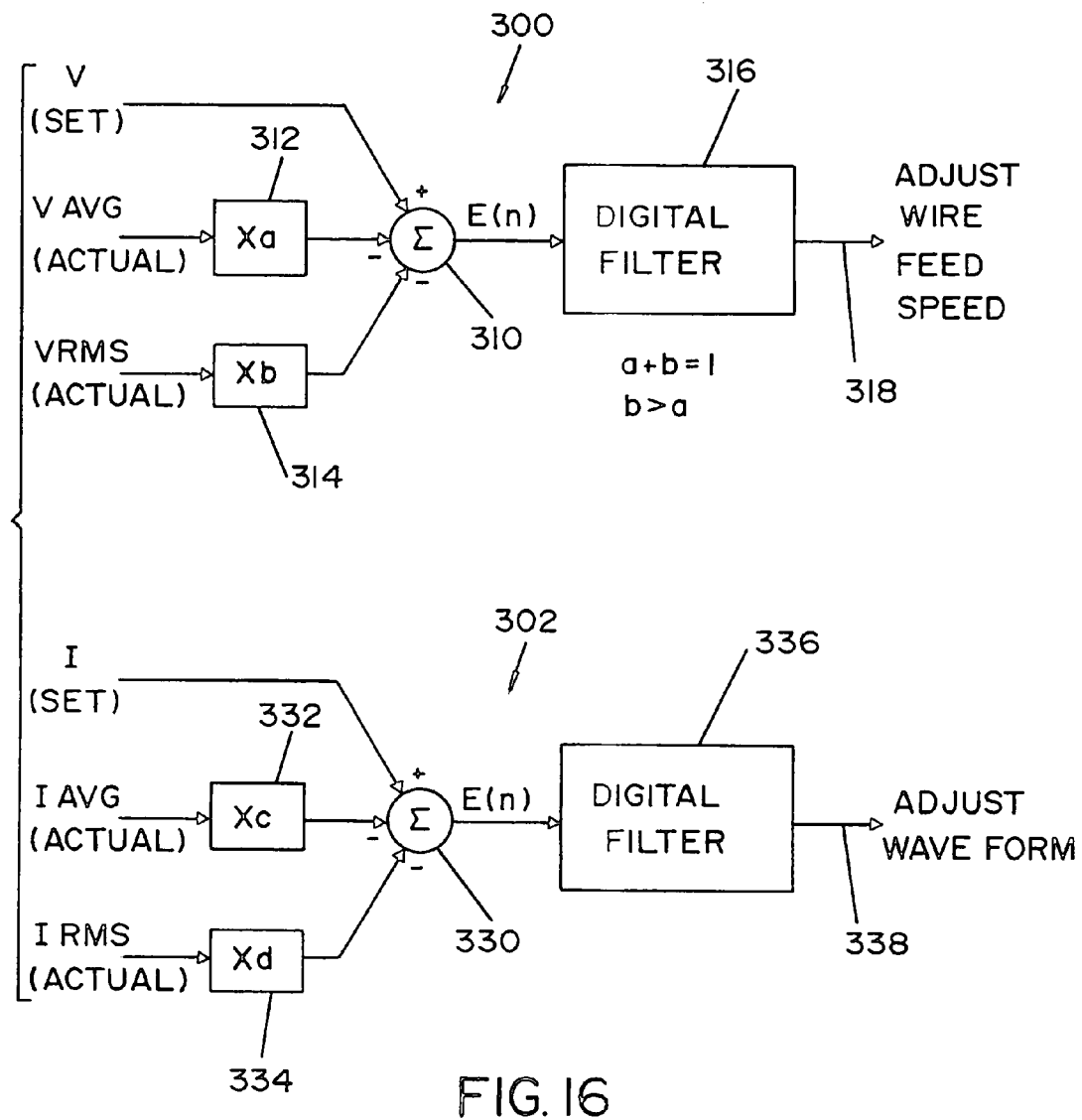
FIG. 16 is a block diagram showing a digital filter to adjust the wire feed speed based upon a comparison of a set voltage to a signal involving a component of average and rms voltage and also a digital filter to adjust the waveform upon a comparison of a set current to a signal involving a component of average and rms current.

With reference to FIG. 16, two digital error amplifiers 300, 302 compute current and voltage error signals for use in a constant current, constant voltage welding process control. Digital error amplifier 300 includes difference operator 310, weighting factors a 312 and b 314, and digital filter 316. Digital error amplifier 300 has the same voltage inputs and general circuit topology as amplifier 240 of FIG. 14; however, digital error amplifier 300 produces control signal 318 for controlling wire feed speed during the welding process. With increasing output of amplifier 300 the wire feed speed should be decreased, while with decreasing output of amplifier 300 the wire feed speed should be increased. Digital amplifier 302 includes difference operator 330, weighting factors c 332 and d 334, and digital filter 336. Digital error amplifier 302 has the same current inputs and general circuit topology as amplifier 260 of FIG. 15, and produces control output 338 for adjusting the waveform shape in accordance with the method described in Blankenship U.S. Pat. No. 5,278,390. Hence, the waveform shape and the wire feed speed are simultaneously controlled using digital error amplifiers 300, 302 to keep both voltage and current constant.

Figure 17:
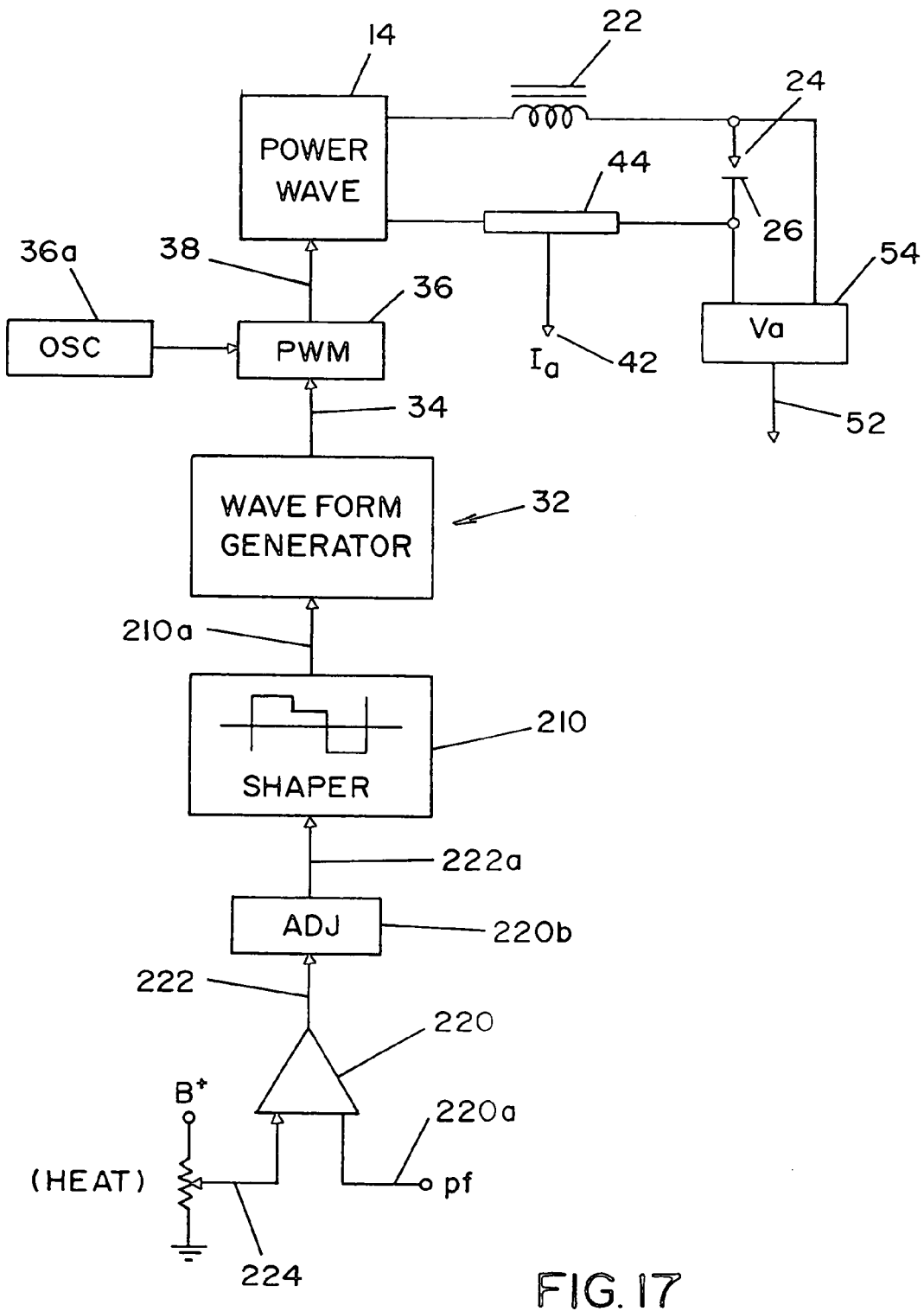
FIG. 17 is a block diagram similar to the block diagram illustrated in FIG. 12 wherein the power factor value of FIG. 10 is adjusted manually to control the power factor of the welding process, while maintaining the rms current constant to thereby adjust the heat by modifying the shape of the waveform controlled by the wave shaper.
Figure 18:
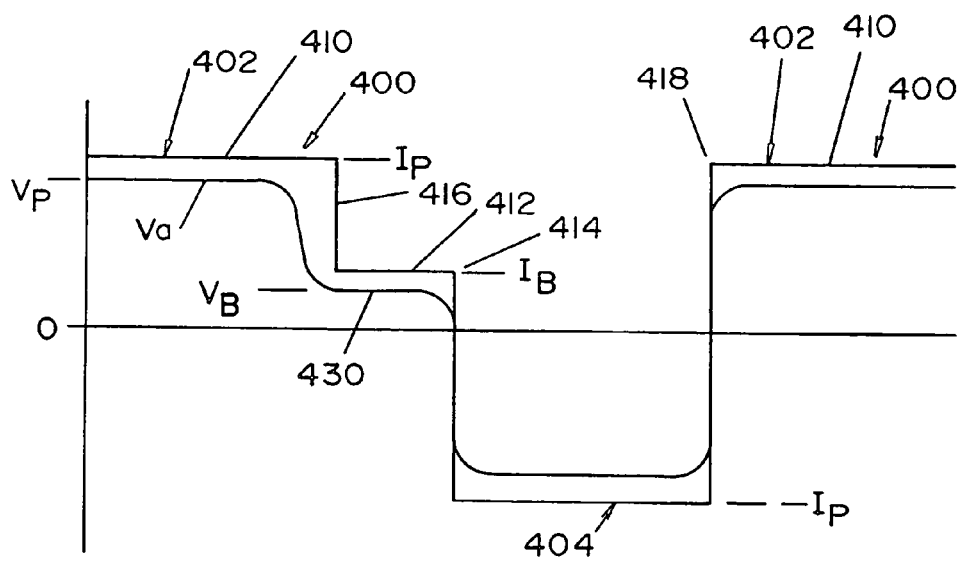
FIG. 18 is a diagram illustrating the waveform of the welding process to which the invention is particularly directed, including a peak current portion and a background current portion in an A.C. pulse welding mode.
Figure 19:
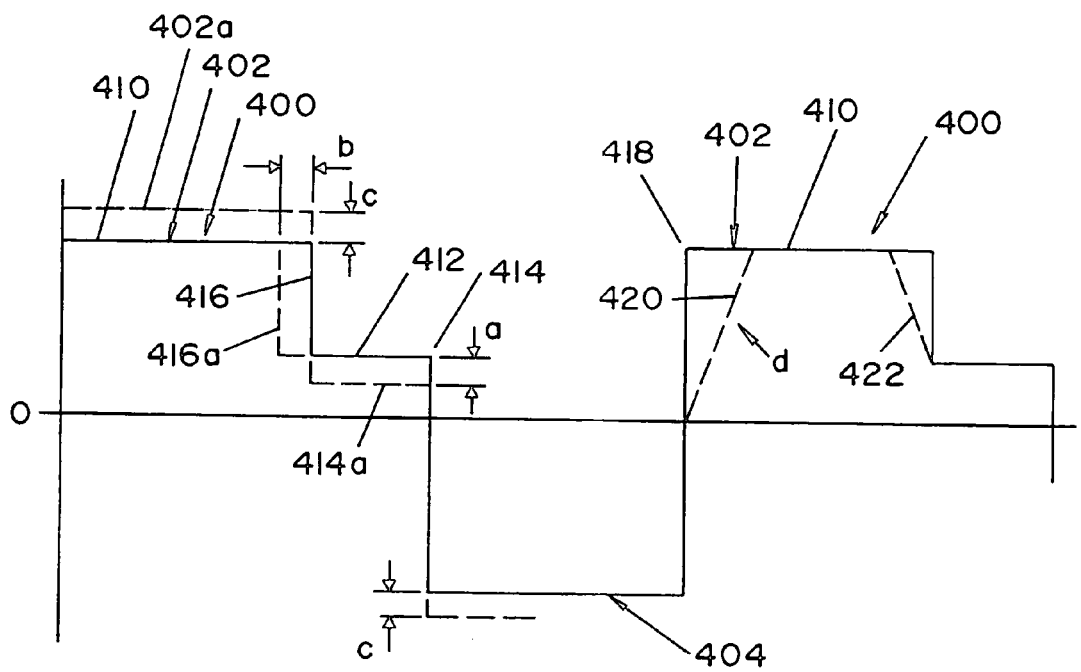
FIG. 19 is a diagram similar to FIG. 18 showing how the shape of the waveform is adjusted to maintain a desired welding heat by using the present invention.

FIGS. 17–23 disclose the use of the present invention for an A.C. pulse welding operation, wherein the heat of the A.C. pulse welding operation is controlled by changing certain aspects of waveform 400, best show in FIGS. 18, 19. Referring now to FIG. 17, Power Wave power source 14 produces a waveform across electrode 24 and workpiece 26 through choke 22. A voltage in line 210a is created across the arc to provide a real time representation of the arc voltage. In a like manner, shunt 44 produces a voltage in line 42 which is the instantaneous arc current. As previously described, waveform generator 32 has an output represented by lead 34 to control the duty cycle of the pulse width modulator 36. The modulator is normally preformed by software and has a pulse rate established by oscillator 36a. Of course, a hardwired pulse width modulator is sometimes employed. The digital or analog voltage on line 38 determines the wave shape of the welding operation waveform performed by the power source. A Power Wave sold by The Lincoln Electric Company of Cleveland, Ohio is the illustrated, preferred power source. This unit is disclosed generally in Blankenship U.S. Pat. No. 5,278,390. The waveform created by generator 32 has a shape controlled by wave shaper 210 so the output voltage, digital or analog, on line 210a determines the signal in line 34 that generates the specific current waveform at the welding operation. As so far described, the technology is explained above and is well known in the art. In accordance with of the invention, digital comparator 220, having an output 222 compares the real time power factor signal represented by the value in line 220a with the desired heat to be created as represented by the digital or analog voltage at line 224. Thus, output voltage in line 222 is the voltage indicating the relationship between the real time power factor and the desired heat, which is represented as the desired power factor in line 224. In accordance with the invention, an adjusting circuit 220b provides a signal in line 222a that is responsible to the different signal in line 222. Thus, as the signal in line 222 varies, the output voltage in line 222a modifies the wave shape in wave shaper 210 to change the shape of the waveform. This action obtains the desired heat as referenced by the manually adjusted voltage in line 224. The block diagrams shown in FIG. 17 are performed digitally by controller software using standard DPS to perform waveform technology control of the electric arc welder. The voltage on line 222a modifies the A.C. pulse waveform structured by wave shaper 210 to maintain the desired heat based upon a relationship with the real time power factor. To accomplish this objective, various aspects of waveform 400 are adjusted by circuit 220b.

Figure 20:
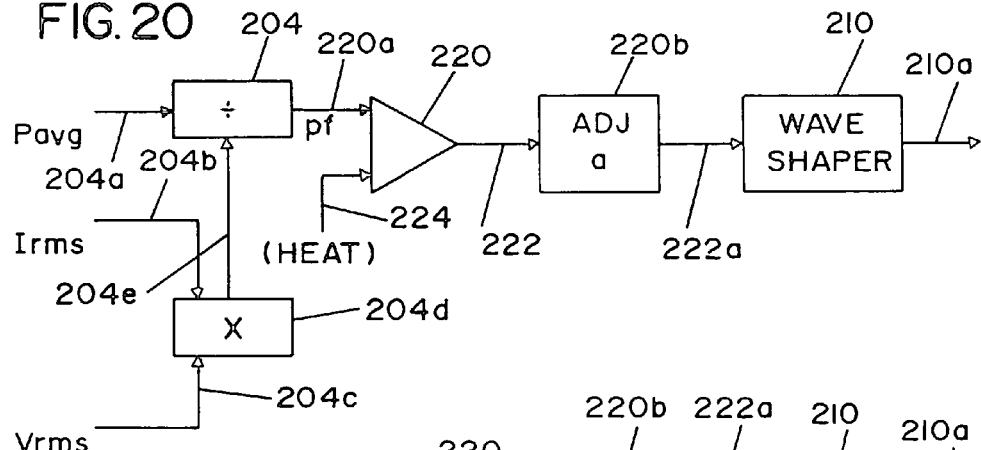
FIGS. 20 and 21 are block diagrams showing the circuit for adjusting the background current of the waveform to control peaks using the generated real time power factor value.
Figure 21:
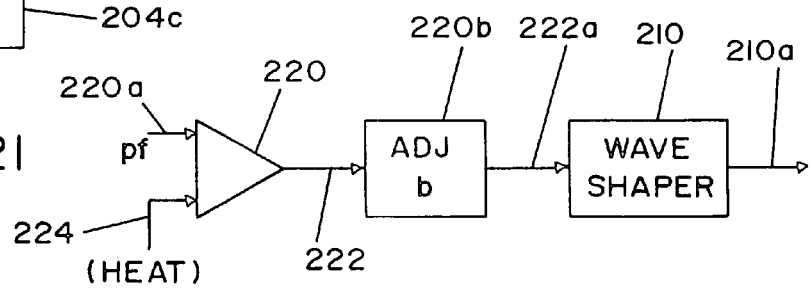
Figure 22:
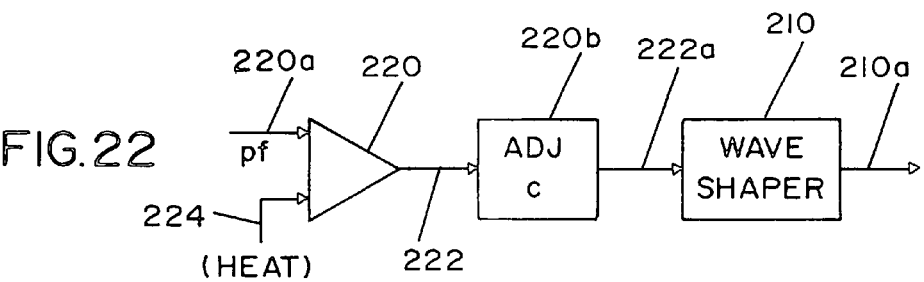
FIGS. 22 and 23 are diagrams similar to FIGS. 20, 21 for adjusting the peak current of the waveform used to generate the welding operation to control heat by using the real time power factor value.
Figure 23:
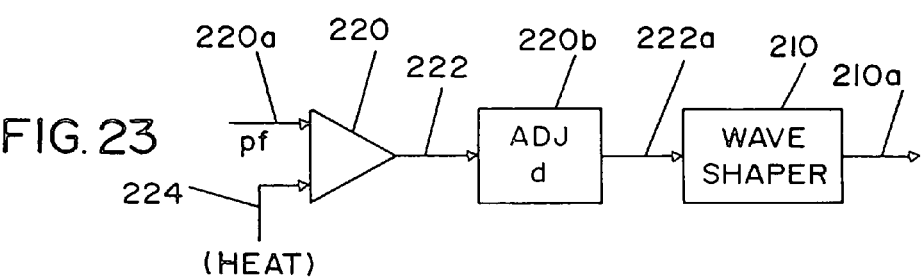

To illustrate various portions of the waveform which are adjusted to control heat, waveform 400 is shown schematically in FIGS. 18 and 19. Waveform 400 comprises one of a succession of A.C. pulses including a positive pulse segment 402 and a negative pulse segment 404. In the preferred embodiment, positive pulse segment 402 is constructed with a peak current portion 410 and a background portion 412 ($V_a$ background portion 430). The magnitude of the peak current is represented as level 418. As shown in FIG. 19, heat adjustment of waveform 400 is accomplished by changing peak level 418, shown as dashed lines 402a and represented by c. Adjustment of the magnitude of the peak current is one implementation of the invention, where the shape of the waveform is modified to control heat, based upon the real time power factor of the welder. Height 414 of background current portion 412 is indicated as adjustable by dashed lines 414a. In a like manner, leading edge 416 is adjustable to change the heat of the welding operation as indicated by dashed line 416a. Magnitude change a of the background current and the change b in the width of background current are the primary adjustments implemented to cause waveform 400 to create the desired welding heat, while maintaining $I_{rms}$ constant. The primary aspect of the invention for modifying peak current portion 410 is adjustment of peak current magnitude as indicated by c as the distance between line 402a and line 402. However, peak portion 410 normally has a leading ramp 420 and a trailing ramp 422 as shown in the second occurrence of waveform 400. These two ramps are adjustable to change the heat at the welding operation under the control of the real time power factor. As illustrated in FIG. 19, the dimensions a, b, and c as well as the angles of the ramps indicated by d, are adjustable to control heat. Circuits to accomplish these adjustments are illustrated in FIGS. 20–23. In these figures, digital circuit 220b controls the wave shaper 210 by the voltage in line 222a. FIG. 20 illustrates the use of circuit 220b to adjust dimension a. Dimension b is adjusted by the circuit shown in FIG. 21. Using the circuits shown in FIGS. 20 and 21 the magnitude of the background current in portion 412 is varied so that the power factor signal at line 220a is compared with the desired heat represented as a voltage on line 224 to change the background current. Thus, the background current is adjusted to maintain the desired heat caused by the waveform 400. The circuits in FIGS. 22 and 23 implement adjustments of the dimensions c, d. This changes the magnitude of the peak current or the angle of one or both ramps 220, 222. In this manner, the peak current portion of waveform 400 is adjusted to create the desired heat. Other aspects of the waveform are adjustable to control the desired heat based upon the real time power factor of the welding operation using a circuit as shown in FIGS. 20–23.

Figure 24:
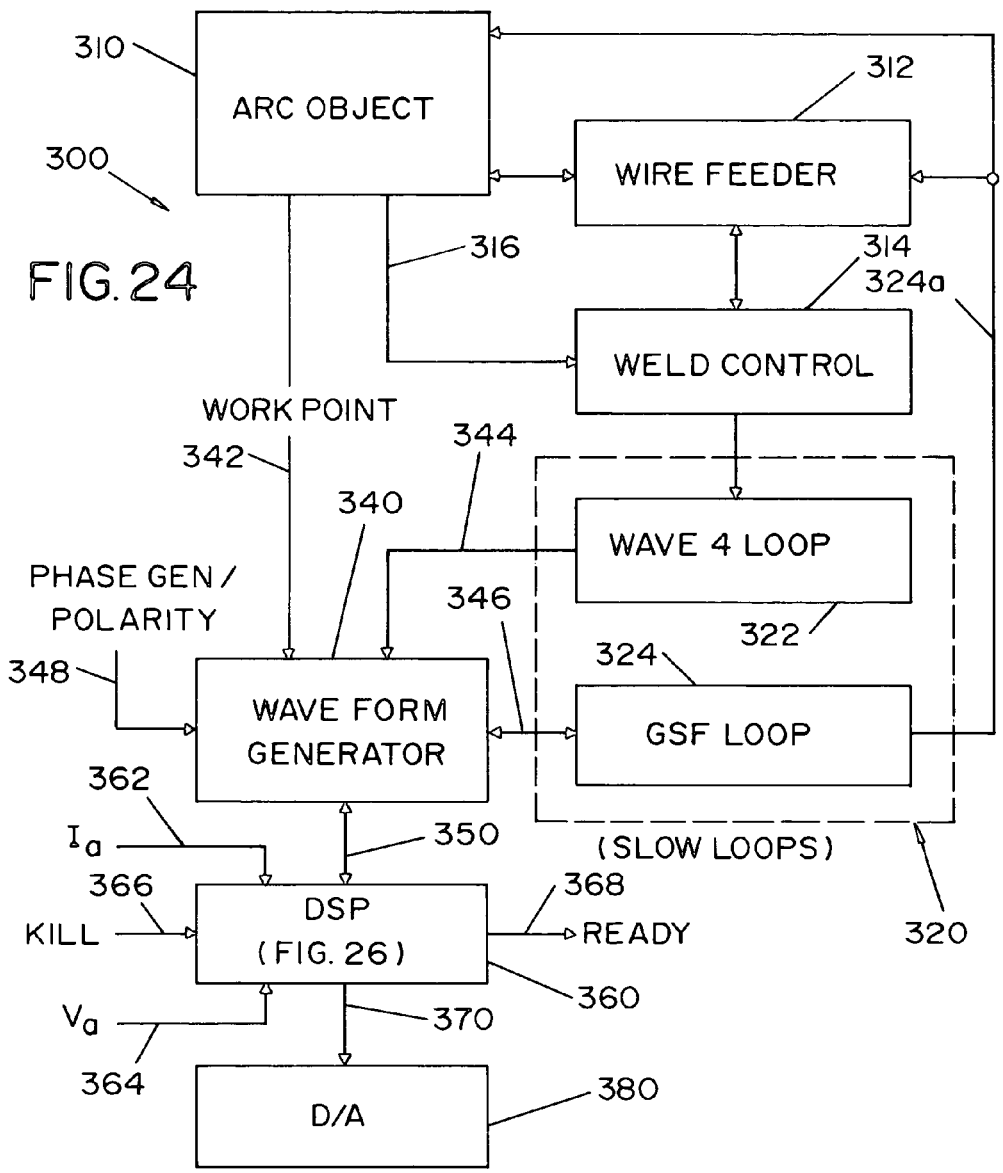
FIG. 24 is a block diagram of the submerged control algorithm in block diagram form disclosing a system used in practicing the present invention.
Figure 25:
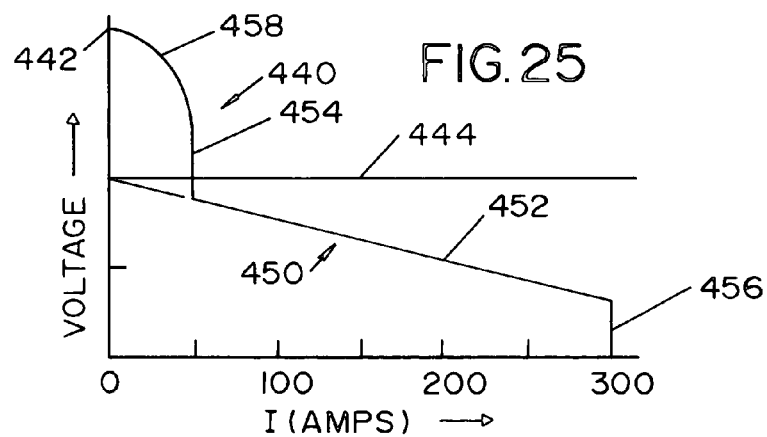
FIG. 25 is a voltage current curve showing a load line obtained by an inverter type power source using the present invention.
Figure 29:
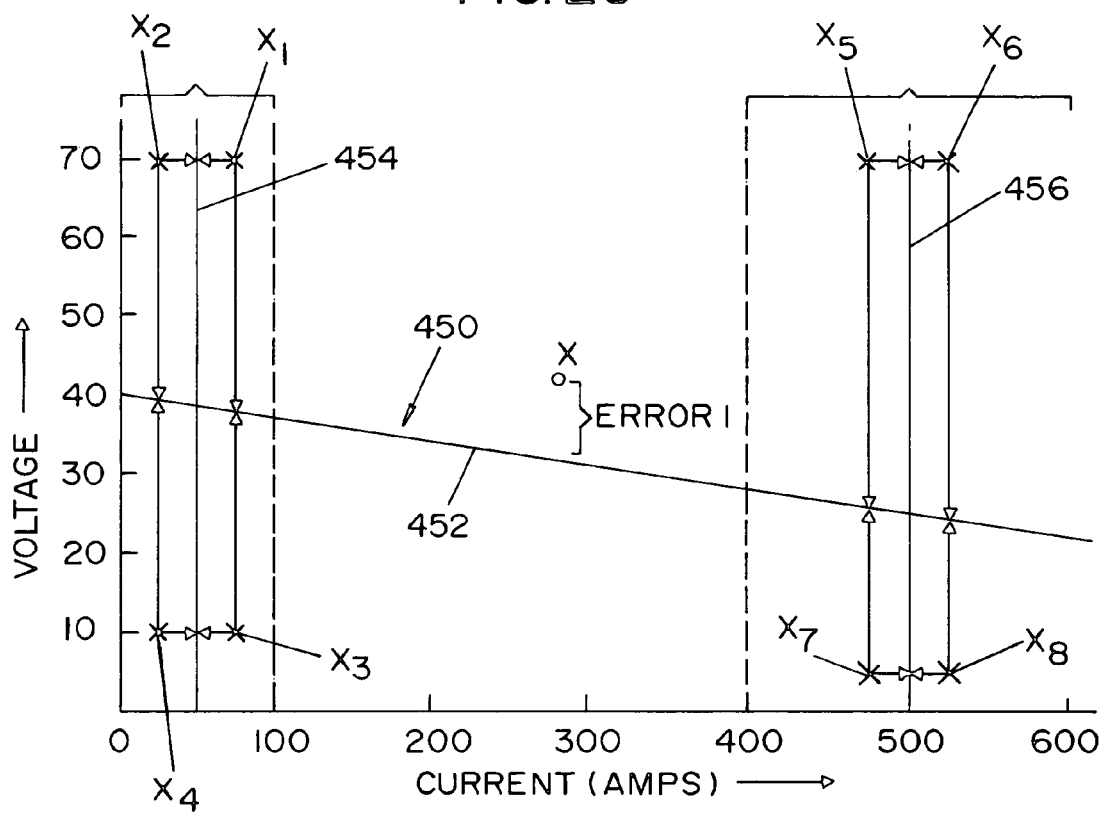
FIG. 29 is a load line similar to the load line shown in FIG. 25 and employing the present invention in both dynamic and long term operations.
Figure 28:
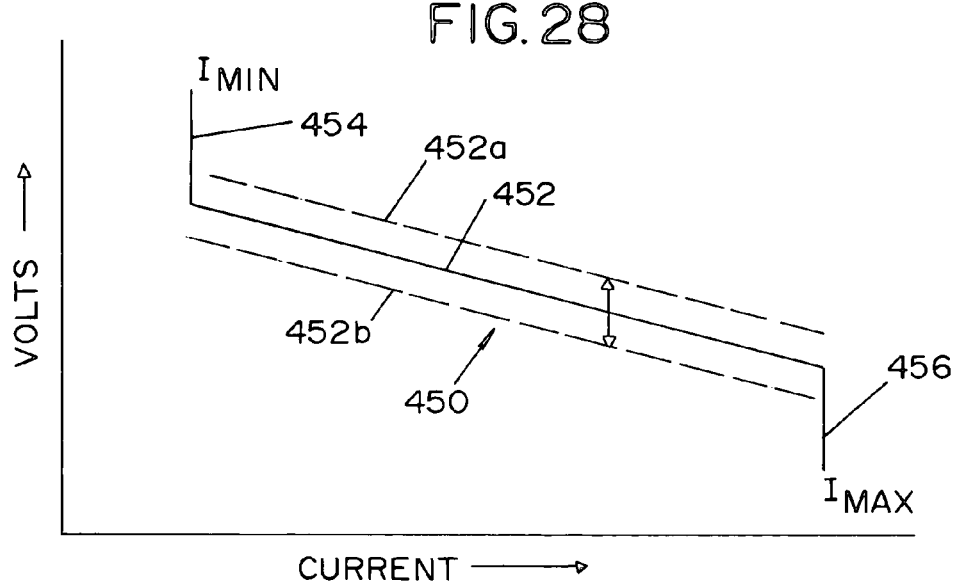
FIG. 28 is a graph similar to the graph in FIG. 25 and illustrating an aspect of the minimum current and maximum current feature of the present invention.

The present invention is added to the system so far described in FIGS. 1–23 and utilizes circuits of the type generally shown in FIGS. 14–16 for adjusting the waveform of the waveform generator in accordance with parameters developed during the welding operation. The general system using the invention is illustrated in FIG. 24 disclosing the algorithm for a submerged arc control of the type to which the present invention is particularly adapted. Operating system 300 includes an "arc object", which is the layer of the algorithm that is controlled by the operator. The normal current and wire feed speed is loaded in weld tables in the arc logic library 310. Then, depending upon which mode of welding is selected, variables are transferred to the controller for the global scale factor (GSF) used in the circuits of FIGS. 14 and 15. These circuits adjust the waveform desired in the welding operation. If a constant voltage mode is selected, the variable is the current for controlling the waveform generator. This is the preferred implementation of the present invention. The wire feed speed is used to control a constant current mode of operation. If multiple machines are connected in parallel the arc object layer determines what should be outputted from each machine to achieve the desired weld. This structure is described in Houston U.S. Pat. No. 6,472,634 incorporated by reference herein. Consequently, the arc object is a library for selecting the parameters or variables of operating system 300. This arc object library is general purpose and can operate system 300 in a manner different than the proposed invention. Arc object library 310 receives information from wire feeder 312. The nominal wire feed speed is determined by the table of arc object library selected to be processed. The weld control signal from weld control 314 informs the wire feeder of the sequencer state in which the system is operating, as well as the target output voltage. The system uses a proportional control for constant current welding. Such system is used in a Power Wave welder as disclosed in Blankenship U.S. Pat. No. 5,278,390. Wire feeder 312 adds an offset to the normal wire feed speed adjusted in the manner disclosed in FIG. 16. The feeder adds an offset to the nominal WFS based on the desired voltage and actual rms voltage computed in the digital signal processor (DSP) of the welder controlled by the system shown in FIG. 24. The wire feeder does not form a part of the present invention. However, weld control 314 receives information from the arc object library and operates the weld sequencer and sets up waveform generator variables based upon an operator setting of library 310. Thus, weld control 314 selects the variables used to control the waveform generator by a set of slow loops 320, identified as a Wave 4 loop 322 and a GSF loop 324. Information on line 316 to weld control 314 controls the information, as shown in FIGS. 14–16. The output digital filters of these figures adjust the waveform of the waveform generator to control the error signal directed to the filters. Loops 322,324 are operated fairly slowly in a time sense to control the waveform outputted by waveform generator 340 having a first input 342 which is the work point from the arc object library 310. Waveform generator 340 produces a waveform controlled by current or power in accordance with the technology so far explained. However, when using the present invention, the waveform generator controls the shape of the waveform to provide a voltage with a slope, as shown in FIGS. 25, 28 and 29. Various sine wave and pulse wave can be constructed using the waveform generator, as taught in Blankenship U.S. Pat. No. 5,278,390. However, the invention involves using the waveform generator to produce a voltage with a slope to mimic the dynamic operation of transformer based power sources identified as DC 1000 and AC 1200 sold by The Lincoln Electric Company of Cleveland, Ohio. First loop 322 adjusts the peak portion of the wave shape to maintain the desired rms current. This is shown in the lower view of FIG. 16. In practice, filter 336 is a PI type filter with an additional pole to cut off the higher frequencies. The normal outer loop of operating system 300 is set to adjust the Wave 4 loop to maintain rms current based upon the workpoint in line 342. GSF loop 324 adjusts either the current or the wire feed speed to maintain the desired rms voltage as shown in the upper view of FIG. 16. The slow loops 322, 324 control the waveform generator to change the wave shape in a manner to correct the error from these two feedback loops. Loop 324 has an output line 324a to adjust the wire feed speed and communicate with library 310. This is illustrated in the upper view of FIG. 16. As so far explained, waveform generator 340 receives feedback error information in lines 344 and 346 to control the waveform outputted from the generator on line 350. As disclosed in Houston U.S. Pat. No. 6,472,634, input 348 sets the phase of the generator and the plurality of the output waveform directed through line 350 to digital signal processor 360. The present invention is performed in DSP 360 that receives arc current in line 362 and arc voltage in line 364. A kill signal 366 is directed to the digital signal processor to indicate that the inverter should discontinue operation to reduce the current across the various switches of the inverter awaiting a READY signal. When the switches are all below a preselected value as taught in Stava U.S. Pat. No. 6,111,216, a READY signal is generated in line 368. This signal, from various parallel power sources, is employed to coordinate switching of parallel power sources. The waveform in line 350 is controlled by operating system 300 with the use of slow loops 320, together with an outer loop including wire feeder. The present invention is performed in DSP 360 so that the waveform generator output in line 350 is modified to produce a digital control signal in line 370 directed to the digital to analog converter 380 for controlling the inverter of the welder. The invention will now be explained as it is performed in the DSP, which receives a KILL signal and then issues a READY signal when the current is reduced to a level for low current polarity switching. The DSP includes the circuit illustrated in FIG. 26 to perform the present invention to create a signal in line 370 to achieve the output requested by waveform generator 340. Converter 380 translates the digital signal back into an analog signal used to control the output of the inverter or welder.

Figure 26:
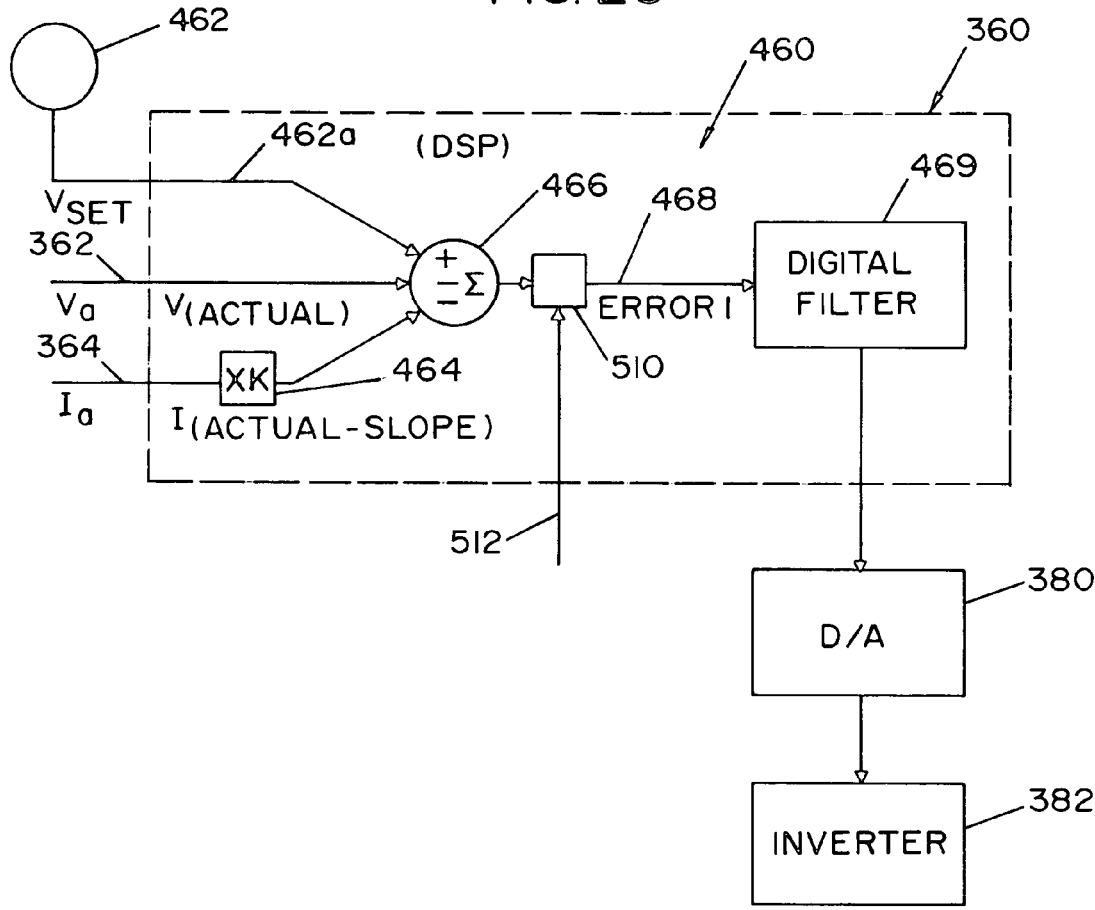
FIG. 26 is a block diagram illustrating the primary voltage error circuit used in the DSP to control voltage in accordance with the invention.
Figure 30:
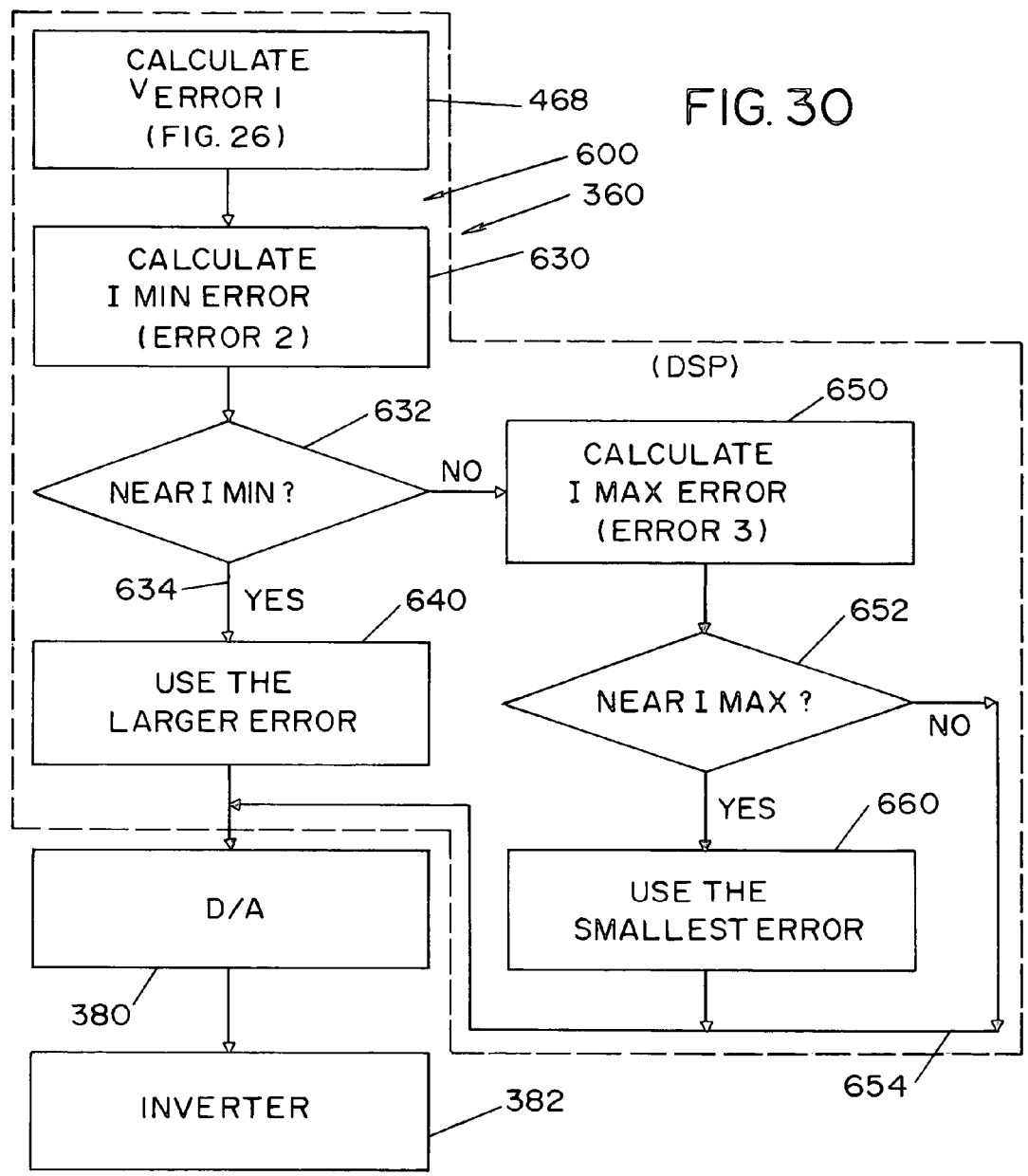
FIG. 30 is a flow chart illustrating an aspect of the present invention as performed in the DSP of the power source; and, FIG. 31 is a line diagram illustrating the circuit used to create the error at the minimum and maximum current areas of the load line positions.
Figure 31:
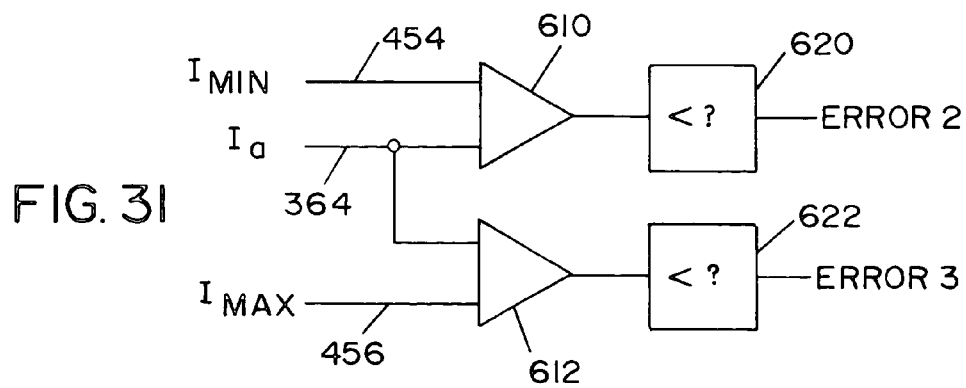

The operating system in the DSP as best shown in FIGS. 26 and 30, produces a voltage current operating curve shown in graph 440 of FIG. 25. The inverter power supply has an open circuit voltage 442 and a normal regulated or set voltage line 444. In accordance with the present invention, the operating system produces a load line 450 which is distinctly different from the load line 444 of a normal, high switching speed inverter type power source. Load line 450 is also shown in FIGS. 28 and 29 and includes a slope section 452 with a minimum current 454 and a maximum current 456. In FIG. 25, section 458 is the load line at currents less than the minimum set current and is prevented from occurring by error amplifiers as shown in FIG. 31. Thus, load line 450 includes sections 452, 454 and 456, with the current clipped at a minimum set level and a maximum set level. The maximum level has a default being the maximum current available from the power source; however, it is set less than this current in practice. By using an operating system constructed in accordance with the present invention for a high switching speed inverter type power source used in an electric arc welder, the load line 450 is constructed with the advantages of the slope obtained heretofore only with power sources of the transformer based type. The new operating system constructs a load line, as shown in FIG. 28. Slope 452 is obtained by the circuit shown in FIG. 26. The error of current, either minimum (ERROR 2) or maximum (ERROR 3) is obtained by a digital circuit schematically represented in FIG. 31. The function of the error signals from FIGS. 26 and 31 are schematically represented in FIG. 29. The first error referred to as the voltage error (ERROR 1) is obtained from the circuit shown in FIG. 26. The second error is the minimum current error and the third error is the maximum current error. The latter two errors are obtained by a digital circuit schematically represented in FIG. 31. Under normal circumstances, the actual operating point X is in the general center portion of slope section 452, as shown in FIG. 29. Consequently, there is no maximum current error or minimum current error as represented in FIG. 31. Under these circumstances, the circuit in FIG. 26 adjusts the arc voltage and arc current of point X. In this process, the arc current is multiplied by the first constant k and added to the actual arc voltage. This is compared to the set voltage 444 of FIG. 25. This creates an ERROR 1, which error signal is the general distance between the actual location of point X and desired location on line 452. The new operating system increases or decreases the voltage of the waveform being processed by the inverter to bring point X to line 452. This produces a zero error and maintains the voltage on slope line 452. If the operating point is between the minimum and maximum currents then only FIG. 26 operates to adjust the inverter. Such locations of points are shown as $X_1$, $X_3$, $X_5$, and $X_7$ in FIG. 29. These points are controlled by ERROR 1. If the operating point tends to be less than minimum current 454, as shown by operating points $X_2$ and $X_4$, ERROR 2 signal is created. The magnitude of this error adjusts the operating point to the right shown in FIG. 29 as well as toward line 452. In a like manner, if the operating point is greater than the maximum current 456, as shown by operating points $X_6$ and $X_8$, the current is clipped at the value 456 to bring the operating point to the left, as shown in FIG. 29. Thus, the basic operating characteristics of the present invention is generation of the ERROR 1 signal to cause the load line of the power source to follow slope line 452 to mimic a transformer type power source. Another feature of the invention is clipping the maximum and minimum currents to produce a curve best shown in FIG. 28. The dashed lines 452a and 452b in FIG. 28 represent the operation of a fairly slow response whereas the solid line is a quick response for thin wire. Fast response is required at minimum and maximum currents to limit the range of the inverter and protect the torch of the plasma stays lit during the welding process for thin wire, even as the voltage is adjusted. The slope can be adjusted more slowly, whereas the minimum and maximum currents must be rapidly adjusted.

Figure 27:
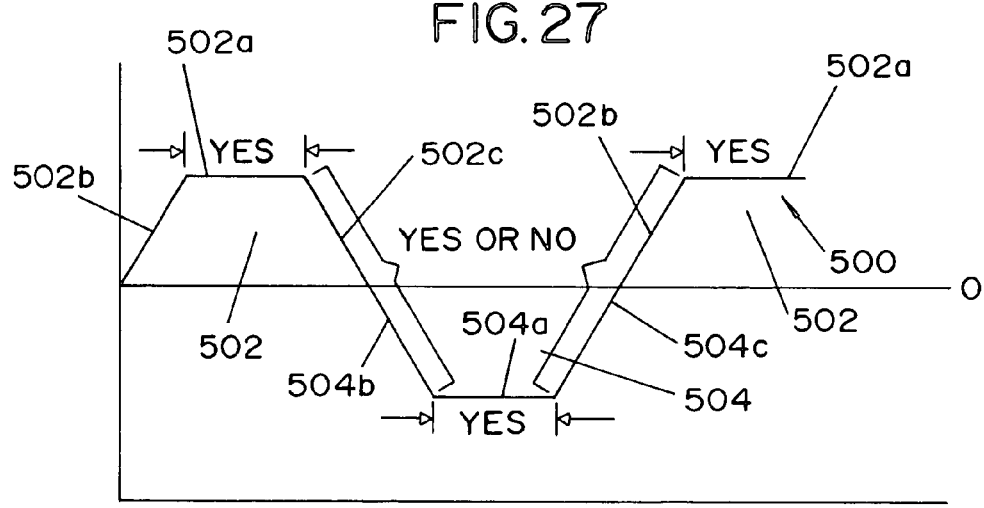
FIG. 27 is a voltage curve of a pulse waveform illustrating a feature of the present invention.

The primary error signal (ERROR 1) is created and processed by the operating system of the present invention by the circuit illustrated in FIG. 26. Error circuit 460 is located in the DSP of the power source controller to create ERROR 1, which is the difference between the operating point X and the desired operating point on slope line 452, as shown in FIGS. 28 and 29. The set voltage is adjusted manually as indicated by knob 462 external of DSP 360. The other two inputs to the DSP used for the error circuit are the actual arc voltage in line 362 and the actual arc current in line 364, as discussed with respect to the overall system algorithm shown in FIG. 24. The digital value representing the actual current appears in line 364 and is multiplied by a slope constant k as indicated by block 464 to produce an actual slope value directed to a negative input of summing junction or circuit 466. The actual slope value is added to the actual voltage value in line 362 and compared with the set voltage value in line 462a. This produces the ERROR 1 signal in line 468. This error is passed through digital filter 469 and outputted to converter 380 for control of inverter 382 constituting the high switching speed power source of the welder. Thus, the voltage of inverter 382 is increased or decreased to reduce the error signal in line 468 causing the inverter to operate along slope load line 452, shown in FIGS. 25, 28 and 29. An option for use with the present invention is schematically in FIG. 27 wherein a pulse waveform 500 is controlled by the waveform generator 340 in accordance with standard waveform technology pioneered by The Lincoln Electric Company of Cleveland, Ohio and disclosed in Blankenship U.S. Pat. No. 5,278,390. Waveform 500 is illustrated as a pulse waveform with positive pulses 502 having peak current 502a and ramp 502b, 502c, as well as negative pulses 504 having peak current 504a and ramp 504b, 504c. In this particular modification of the present invention, various aspects of the pulse can be controlled by the circuit shown in FIG. 26. Otherwise, ERROR 1 has no effect. The areas where ERROR 1 is operative are identified by the word YES. As illustrated, the peak currents are controlled by the error in line 468 of FIG. 26; however, the ramps may or may not be controlled by the three error signals created when using the operating system of the present invention. To illustrate this feature, a pass or no pass circuit 510 has an input 512 controlled by logic from the waveform generator. Thus, when voltage is to be regulated in accordance with the present invention, a logic 1 is outputted from waveform generator 340 in line 512. Otherwise, a logic 0 is outputted from generator 340 to block passage of the signal in line 468. This is an option to the present invention and is used to illustrate that the present invention need not be applied to all portions of the waveform outputted from generator 340.

The basic program or algorithm in DSP 360 is shown in FIGS. 30, 31 where program 380 processes the error 1 signal on line 468. In accordance with the preferred embodiment, the program merely controls the digital converter 360 as shown in FIG. 26; however, to combine the minimum and maximum current limits on curve 450 the program 600 is employed instead of the direct control as shown in FIG. 26. By using program 600 in the DSP, the error signal (ERROR 1) in line 26 is calculated or otherwise determined. Then, the minimum and maximum current errors (ERROR 2, ERROR 3) by a digital circuit are calculated, as schematically represented in analog format in FIG. 31. Comparators 610, 612 have inputs from the minimum current on line 454, the maximum current on line 456 and the actual arc current on line 364. Comparator 610 determines the relationship of the actual current to the minimum current. This is then directed to a detector circuit 620. If the current is less than the minimum current, an ERROR 2 signal is created or calculated. In a like manner, comparator 612 determines the relationship of the actual current with the maximum set current and detector 622 creates or calculates an ERROR 3 signal when the actual current is above the maximum current set in line 456. Turning again to the program in FIG. 30, box 630 determines if there is an ERROR 2 signal. If there is an ERROR 2 signal, it means the current is near the minimum current as indicated by decision dock 632. This produces a YES signal in line 634 to use the larger error as indicated by block 640. This block indicates that the D/A converter 380 receives the larger of the ERROR 1 or ERROR 2 signals for adjusting inverter 382. If there is no ERROR 2 signal, as determined by block 630, block 650 is activated to determine if there is an ERROR 3 signal indicating a maximum current error. This would mean the signal is near the maximum current level as distinguished by decision block 652. If the current is not near the minimum level nor the maximum level, a signal in line 654 bypasses program 600 and merely controls the inverter by the circuit shown in FIG. 26. If the decision block 650 indicates that there is an ERROR 3 signal then block 660 is activated using the smaller of ERROR 3 and ERROR1 to control inverter 382. Program 600 is one program for maintaining minimum and maximum current. However, the currents can merely be clipped at the values 454 and 456 to assure operation along sloped line 452.

The present invention is explained with respect to FIGS. 24–31 as an add-on to or in addition to, the welder control system disclosed in FIGS. 1–23. This new operating system incorporates features of the prior operating system especially as illustrated in FIGS. 14–16. When the system is used with parallel inverters it incorporates features from Houston U.S. Pat. No. 6,472,634. READY signals in line 368 from various power sources, one of which is shown in FIG. 24, are combined with the phase generator and polarity input of line 348 to control the timing and polarity of waveform generator 340. A KILL signal in line 366 is directed to each parallel power source and when all power sources are ready to be switched the controller receives a command based upon existence of a READY signal from all DSPs. The invention can, thus, be used in single welders or parallel welders.

Having thus defined the invention, the following is claimed:

1. An electric arc welder configured to selectively operate in a non-regulated voltage mode and a regulated voltage mode for performing a given weld process with a selected A.C. pulse current waveform performed between an electrode and a workpiece, said current waveform including a positive segment and a negative segment, with at least one segment including a peak current and background current, said welder comprising: a power source with a controller having a digital processor including first program operations operable in the non-regulated voltage mode to calculate the real time power factor of the weld current and weld voltage; and, a circuit to adjust said background current to maintain said power factor at a given level, second program operations operable in the regulated voltage mode to control the waveform voltage by an error circuit having an error output signal generated by a difference between a first input signal representing a desired or set voltage for at least a portion of said waveform and a second input signal representing a sum of an arc voltage and an arc current of said waveform multiplied by a slope constant, and an adjustment operation to reduce said error output signal by adjusting the voltage of said waveform.

2. An electric arc welder as defined in claim 1 wherein said controller includes a wave shaper having an input with a value determining the shape of said waveform and an error circuit for comparing said actual real time power factor with a desired power factor to create a corrective value and a circuit to direct said value to said input of said wave shaper whereby said actual real time power factor is held at said desired power factor.

3. An electric arc welder as defined in claim 2 wherein said waveform is created by a number of current pulses occurring at a frequency of at least 18 kHz with a magnitude of each pulse controlled by a wave shaper.

4. An electric arc welder as defined in claim 3 wherein said background current is adjusted in magnitude.

5. An electric arc welder as defined in claim 3 wherein said background current is adjusted in length.

6. An electric arc welder as defined in claim 2 wherein said background current is adjusted in magnitude.

7. An electric arc welder as defined in claim 2 wherein said background current is adjusted in length.

8. An electric arc welder as defined in claim 2 including a circuit to control heat of said weld process by adjusting said given level.

9. An electric arc welder as defined in claim 1 wherein said waveform is created by a number of current pulses occurring at a frequency of at least 18 kHz with a magnitude of each pulse controlled by a wave shaper.

10. An electric arc welder as defined in claim 1 wherein said background current is adjusted in magnitude.

11. An electric arc welder as defined in claim 10 including a circuit to control heat of said weld process by adjusting said given level.

12. An electric arc welder as defined in claim 1 wherein said background current is adjusted in length.

13. An electric arc welder as defined in claim 12 including a circuit to control heat of said weld process by adjusting said given level.

14. An electric arc welder as defined in claim 1 including a circuit to control heat of said weld process by adjusting said given level.

15. An electric arc welder as defined in claim 1, wherein the first program operations used to calculate the realtime power factor of the weld current and weld voltage further include, an algorithm to calculate the rms weld voltage, the rms weld current and the average power of said power source; a circuit to multiply said rms current by said rms voltage to produce an rms power level; a circuit to divide said average power by said rms power to create a value representing the actual real time power factor of said power source.

16. An electric arc welder as defined in claim 1 wherein said slope constant is in the range of 0–10%.

17. An electric arc welder as defined in claim 1, including a second error circuit having a second error output signal generated by the difference between a first input with a signal representing the minimum desired current and a second input with a signal representing the arc current and a DSP program to maintain said second error signal positive with said arc current equal to or greater than said minimum current.

18. An electric arc welder as defined in claim 17, including a third error circuit having a third error output signal generated by the difference between a first input with a signal representing the maximum current of said power source and a second input with a signal representing the arc current and a DSP program to maintain said third error signal negative with said arc current equal to or less than said maximum current.

19. An electric arc welder configured to selectively operate in a non-regulated voltage mode and a regulated voltage mode for performing a given weld process with a selected A.C. pulse current waveform performed between an electrode and a workpiece, said current waveform including a positive segment and a negative segment, with at least one segment including a peak current and background current, said welder comprising: a power source with a controller having a digital processor including first program operations operable in the non-regulated voltage mode to calculate the real time power factor of the weld current and weld voltage; and, a circuit to adjust said peak current to maintain said power factor at a given level, second program operations operable in the regulated voltage mode to control the waveform voltage by an error circuit having an error output signal generated by a difference between a first input signal representing a desired or set voltage for at least a portion of said waveform and a second input signal representing a sum of an arc voltage and an arc current of said waveform multiplied by a slope constant, and an adjustment operation to reduce said error output signal by adjusting the voltage of said waveform.

20. An electric arc welder as defined in claim 19 wherein said controller includes a wave shaper having an input with a value determining the shape of said waveform and an error circuit for comparing said actual real time power factor with a desired power factor to create a corrective value and a circuit to direct said value to said input of said wave shaper whereby said actual real time power factor is held at said desired power factor.

21. An electric arc welder as defined in claim 20 wherein said waveform is created by a number of current pulses occurring at a frequency of at least 18 kHz with a magnitude of each pulse controlled by a wave shaper.

22. An electric arc welder as defined in claim 21 wherein said peak current is adjusted in magnitude.

23. An electric arc welder as defined in claim 21 wherein said peak current is adjusted in length.

24. An electric arc welder as defined in claim 20 wherein said peak current is adjusted in magnitude.

25. An electric arc welder as defined in claim 20 wherein said peak current is adjusted in length.

26. An electric arc welder as defined in claim 20 including a circuit to control heat of said weld process by adjusting said given level.

27. An electric arc welder as defined in claim 19 wherein said waveform is created by a number of current pulses occurring at a frequency of at least 18 kHz with a magnitude of each pulse controlled by a wave shaper.

28. An electric arc welder as defined in claim 19 wherein said peak current is adjusted in magnitude.

29. An electric arc welder as defined in claim 19 wherein said peak current is adjusted in length.

30. An electric arc welder as defined in claim 29 including a circuit to control heat of said weld process by adjusting said given level.

31. An electric arc welder as defined in claim 19 including a circuit to control heat of said weld process by adjusting said given level.

32. An electric arc welder as defined in claim 19, wherein the first program operations used to calculate the realtime power factor of the weld current and weld voltage further include, an algorithm to calculate the rms weld voltage, the rms weld current and the average power of said power source; a circuit to multiply said rms current by said rms voltage to produce an rms power level; a circuit to divide said average power by said rms power to create a value representing the actual real time power factor of said power source.

33. An electric arc welder as defined in claim 19 wherein said slope constant is in the range of 0–10%.

34. An electric arc welder as defined in claim 19, including a second error circuit having a second error output signal generated by the difference between a first input with a signal representing the minimum desired current and a second input with a signal representing the arc current and a DSP program to maintain said second error signal positive with said arc current equal to or greater than said minimum current.

35. An electric arc welder as defined in claim 34, including a third error circuit having a third error output signal generated by the difference between a first input with a signal representing the maximum current of said power source and a second input with a signal representing the arc current and a DSP program to maintain said third error signal negative with said arc current equal to or less than said maximum current.

36. An electric arc welder configured to selectively operate in a non-regulated voltage mode and a regulated voltage mode for performing a pulse welding process with a selected waveform performed between an electrode and workpiece where an arc voltage and an arc current are created between the electrode and the workpiece, said waveform having a peak current and a background current, said welder comprising: a power source with a waveform generator having a control signal input with a value determining the shape of said waveform; a controller with first program operations operable in the non-regulated voltage mode, with a first input representative of the actual power factor of said power source, a second input representing a desired power factor and an output signal directed to said signal control input of said wave shape generator wherein said actual power factor is held at said desired power factor by adjusting said background current of said waveform, and second program operations operable in the regulated voltage mode to generate the waveform voltage to have a slope application of a slope constant.

37. An electric arc welder as defined in claim 36 including a device to manually adjust said desired power factor for adjusting the heat of said weld process.

38. An electric arc welder as defined in claim 37 including a control circuit for holding the rms current of said power source at a desired set value as said heat is adjusted.

39. A method of controlling an electric arc welder configured for selective operation in a non-regulated voltage mode and a regulated voltage mode for performing a given pulse weld process with a selected waveform performed by a power source between an electrode and workpiece, said waveform having a peak current and a background current, said method comprising:
in the non-regulated voltage mode,
(a) calculating the actual power factor of said power source using the rms current and rms voltage;

(b) selecting a desired power factor for said power source;

(c) obtaining an error signal by comparing said actual power factor of said power source to said desired power factor of said power source; and, (d) adjusting background current of said waveform by said error signal whereby said actual power factor is maintained at said desired power factors, in the regulated voltage mode, (a) creating an arc voltage and arc current between an electrode, (b) regulating the arc voltage with an error circuit to create an error signal at an output of the error circuit, the error circuit including a first input with a signal representing a set waveform voltage and a second input representing a sum of the actual arc voltage and the actual arc current multiplied by a slope constant, and (c) operating a control program to reduce said error output by adjusting the voltage output of said power source to change said actual arc voltage.

40. The method as defined in claim 39 including manually adjusting said desired power factor to control the heat of said weld process.

41. A method as defined in claim 40 including holding said rms current constant as said desired power factor is adjusted.

42. A method as defined in claim 41 wherein said waveform is created by a number of current pulses occurring at a frequency of at least 18 kHz with a magnitude of each pulse controlled by a wave shaper.

43. A method as defined in claim 40 wherein said waveform is created by a number of current pulses occurring at a frequency of at least 18 kHz with a magnitude of each pulse controlled by a wave shaper.

44. A method as defined in claim 39 wherein said waveform is created by a number of current pulses occurring at a frequency of at least 18 kHz with a magnitude of each pulse controlled by a wave shaper.

45. An electric arc welder configured to selectively operate in a non-regulated voltage mode and a regulated voltage mode for performing a pulse welding process with a selected waveform performed between an electrode and workpiece where an arc voltage and an arc current are created between the electrode and the workpiece, said waveform having a peak current and a background current, said welder comprising: a power source with a waveform generator having a control signal input with a value determining the shape of said waveform; a controller with first program operations operable in the non-regulated voltage mode, with a first input representative of the actual power factor of said power source, a second input representing a desired power factor and an output signal directed to said control signal input of said wave shape generator wherein said actual power factor is held at said desired power factor by adjusting said peak current of said waveform, and second program operations operable in the regulated voltage mode to generate the waveform voltage to have a slope by application of a slope constant.

46. An electric arc welder as defined in claim 45 including a device to manually adjust said desired power factor for adjusting the heat of said weld process.

47. An electric arc welder as defined in claim 46 including a control circuit for holding the rms current of said power source at a desired set value as said heat is adjusted.

48. A method of controlling an electric arc welder configured for selective operation in a non-regulated voltage mode and a regulated voltage mode for performing a given pulse weld process with a selected waveform performed by a power source between an electrode and workpiece, said waveform having a peak current and a background current, said method comprising:

in the non-regulated voltage mode, (a) calculating the actual power factor of said power source using the rms current and rms voltage;

(b) selecting a desired power factor for said power source;

(c) obtaining an error signal by comparing said actual power factor of said power source to said desired power factor of said power source; and, (d) adjusting peak current of said waveform by said error signal whereby said actual power factor is maintained at said desired power factor, in the regulated voltage mode, (a) creating an arc voltage and arc current between an electrode, (b) regulating the arc voltage with an error circuit to create an error signal at an output of the error circuit, the error circuit including a first input with a signal representing a set waveform voltage and a second input representing a sum of the actual arc voltage and the actual arc current multiplied by a slope constant, and (c) operating a control program to reduce said error output by adjusting the voltage output of said power source to change said actual arc voltage.

49. A method as defined in claim 48 including manually adjusting said desired power factor to control the heat of said weld process.

50. A method as defined in claim 49 including holding said rms current constant as said desired power factor is adjusted.

51. A method as defined in claim 50 wherein said waveform is created by a number of current pulses occurring at a frequency of at least 18 kHz with a magnitude of each pulse controlled by a wave shaper.

52. A method as defined in claim 49 wherein said waveform is created by a number of current pulses occurring at a frequency of at least 18 kHz with a magnitude of each pulse controlled by a wave shaper.

53. A method as defined in claim 48 wherein said waveform is created by a number of current pulses occurring at a frequency of at least 18 kHz with a magnitude of each pulse controlled by a wave shaper.

* * * * *